United States Patent [19]
Batter, Jr. et al.

[11] 3,830,563
[45] Aug. 20, 1974

[54] PROCESSING COMPOSITION RELEASE MECHANISM FOR FILM CASSETTE COMPRISING SELF-CONTAINED FILM PROCESSING SYSTEM

[75] Inventors: John F. Batter, Jr., Lincoln; Paul B. Mason, Magnolia; Joseph A. Stella, West Peabody; Paul W. Thomas, Jr., Duxbury; Joseph H. Wright, Peabody, all of Mass.

[73] Assignee: Polaroid Corporation, Cambridge, Mass.

[22] Filed: July 31, 1973

[21] Appl. No.: 384,213

Related U.S. Application Data
[62] Division of Ser. No. 227,092, Feb. 17, 1972, Pat. No. 3,785,725.

[52] U.S. Cl. ............... 352/130, 95/89 R, 352/78
[51] Int. Cl. ............................................ G03c 11/00
[58] Field of Search ............. 95/13, 14, 89 R, 94 R; 352/130, 72, 78

[56] References Cited
UNITED STATES PATENTS
| | | | |
|---|---|---|---|
| 2,435,718 | 2/1948 | Land | 95/13 |
| 2,558,858 | 7/1951 | Land | 95/13 |
| 3,623,417 | 11/1971 | Elovanta | 95/89 R |
| 3,782,262 | 1/1974 | Downey | 352/130 X |

*Primary Examiner*—Richard M. Sheer
*Attorney, Agent, or Firm*—John W. Ericson

[57] ABSTRACT

Apparatus for controlling the release of processing composition in a film cassette comprising a roll of film and containing a film processing system. A container of film processing composition within the cassette is initially sealed by a tear strip that is pulled away, to release the composition for coating on the film, by an arm initially held in an inactive position. The arm is moved to a position adapted to engage a cam formed on a spool about which the film is coiled. The cam engages the arm to detach the tear-tab and release the processing composition when the spool is rotated in a predetermined sense.

1 Claim, 69 Drawing Figures

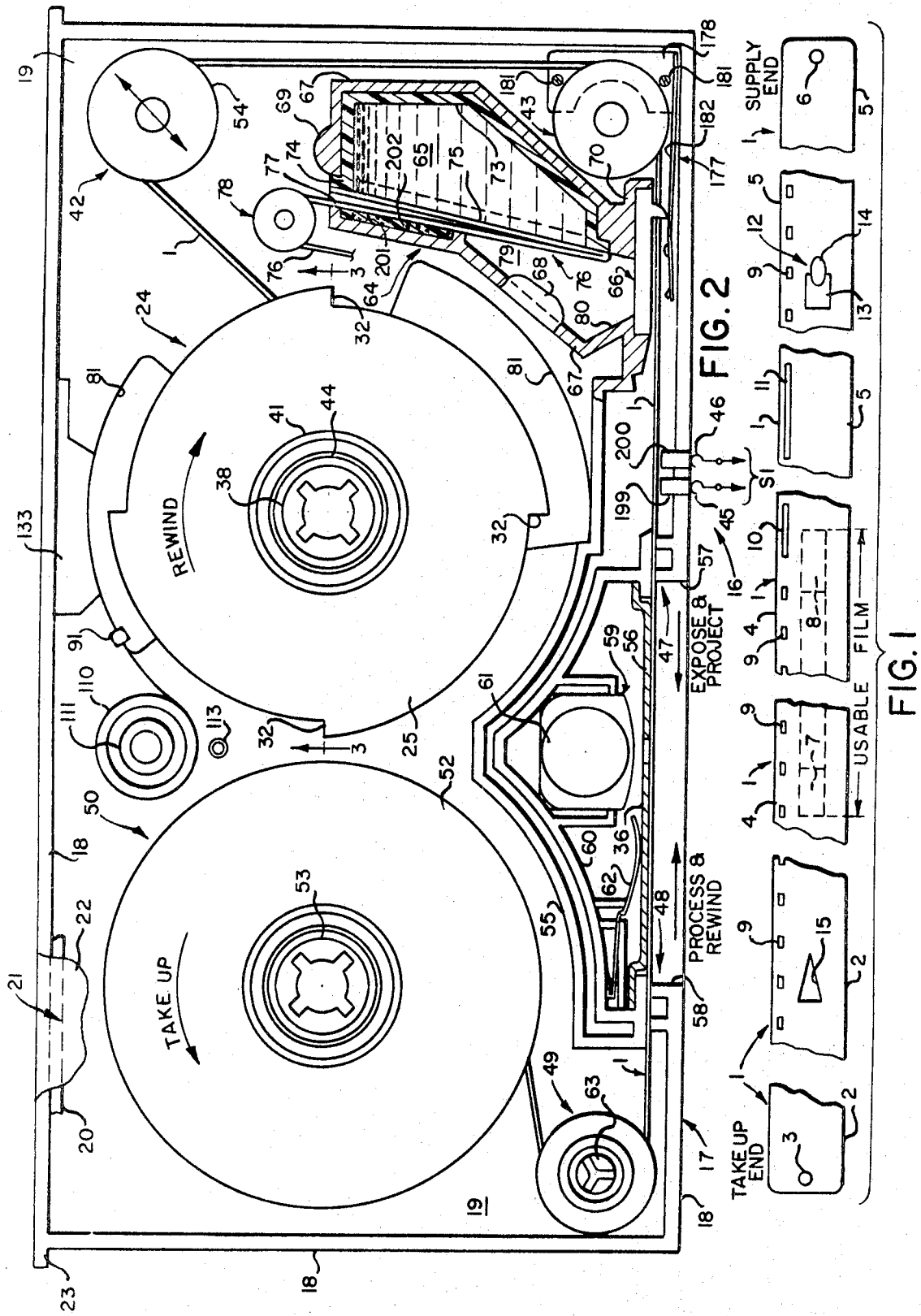

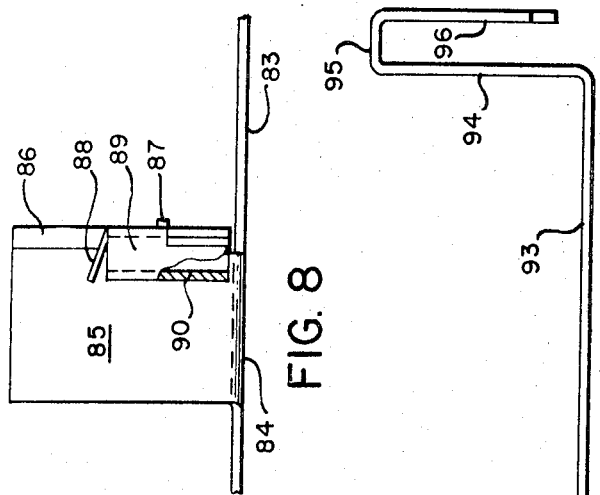
FIG. 8
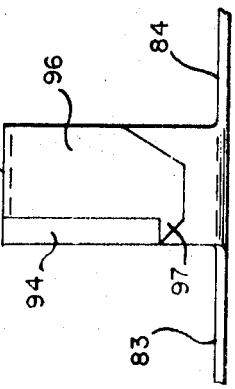
FIG. 9
FIG. 10
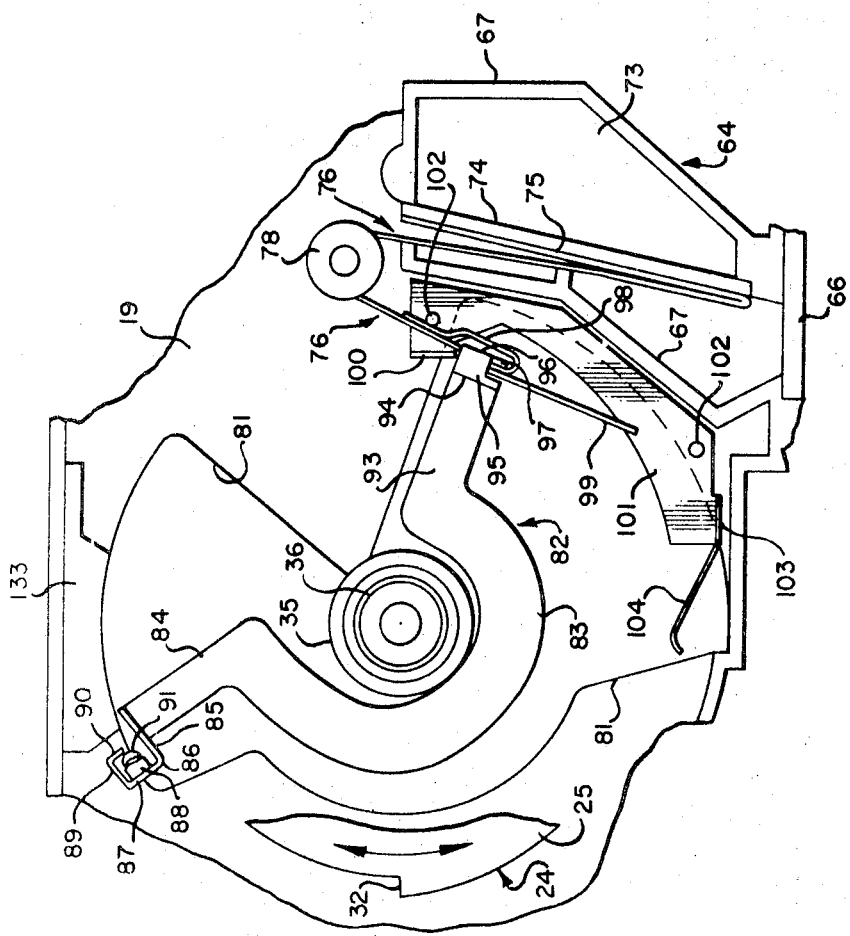
FIG. 5

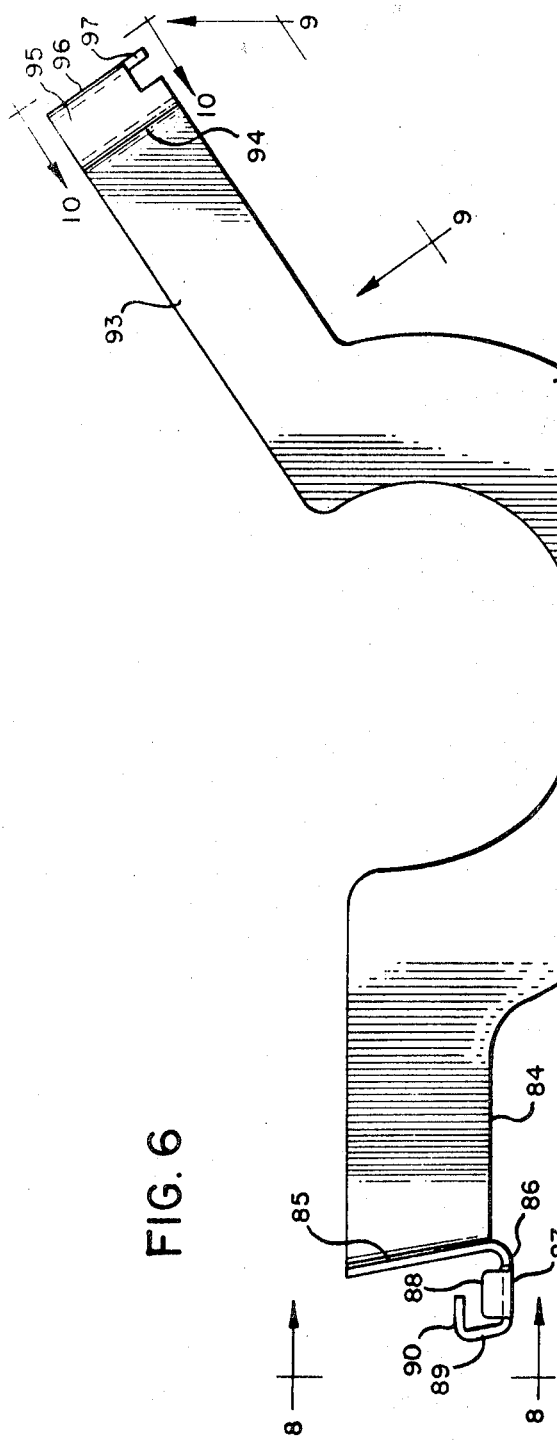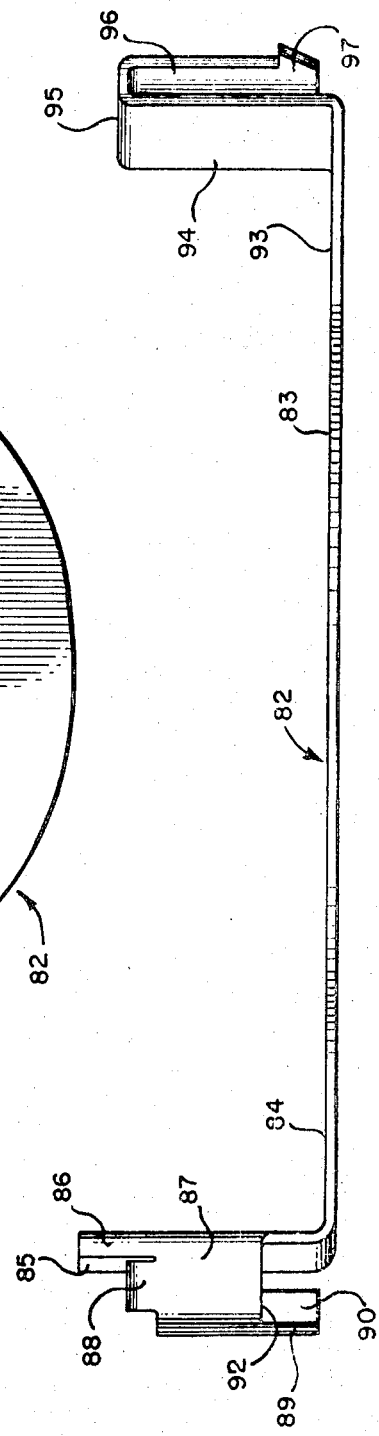

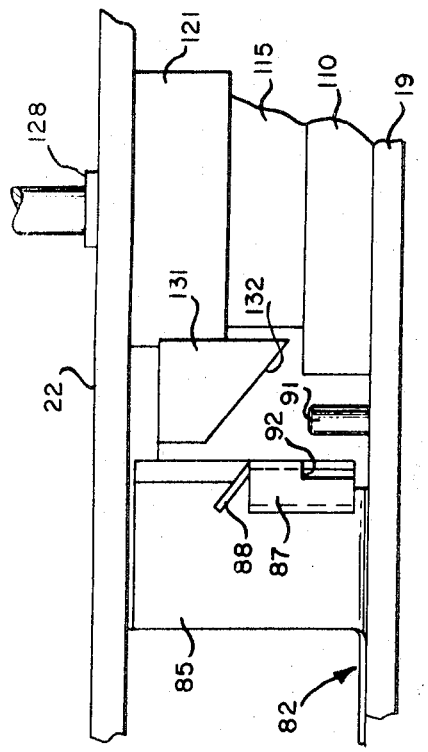
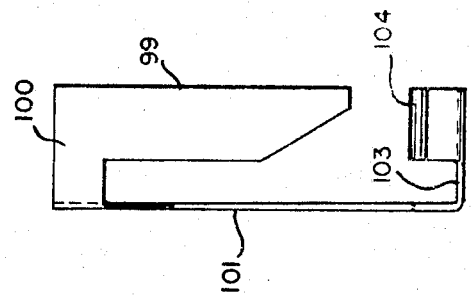
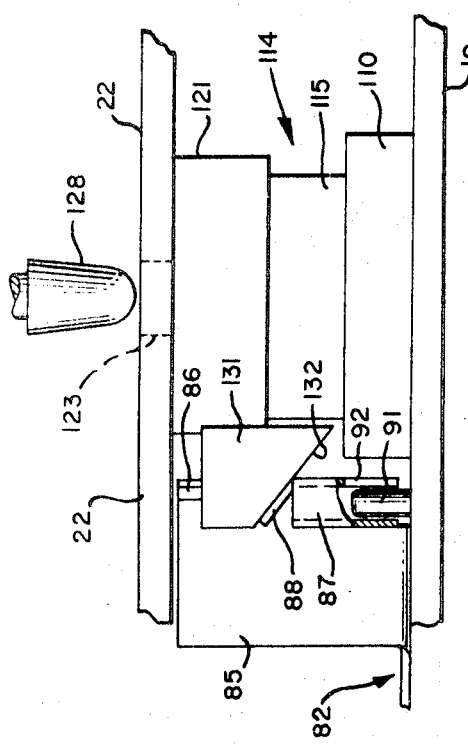
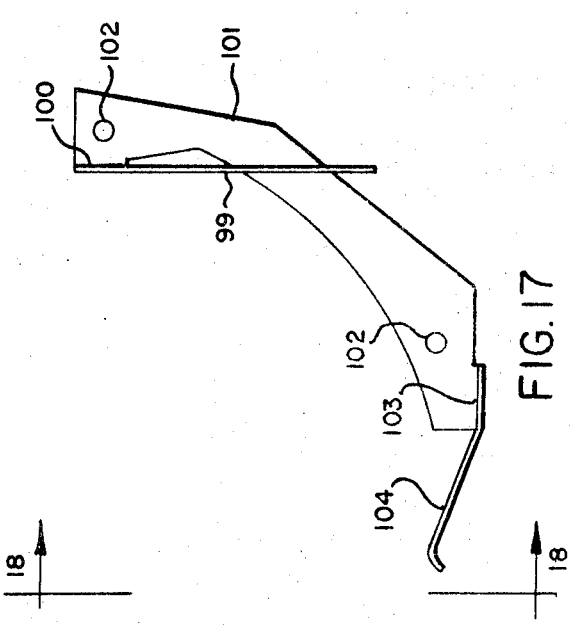

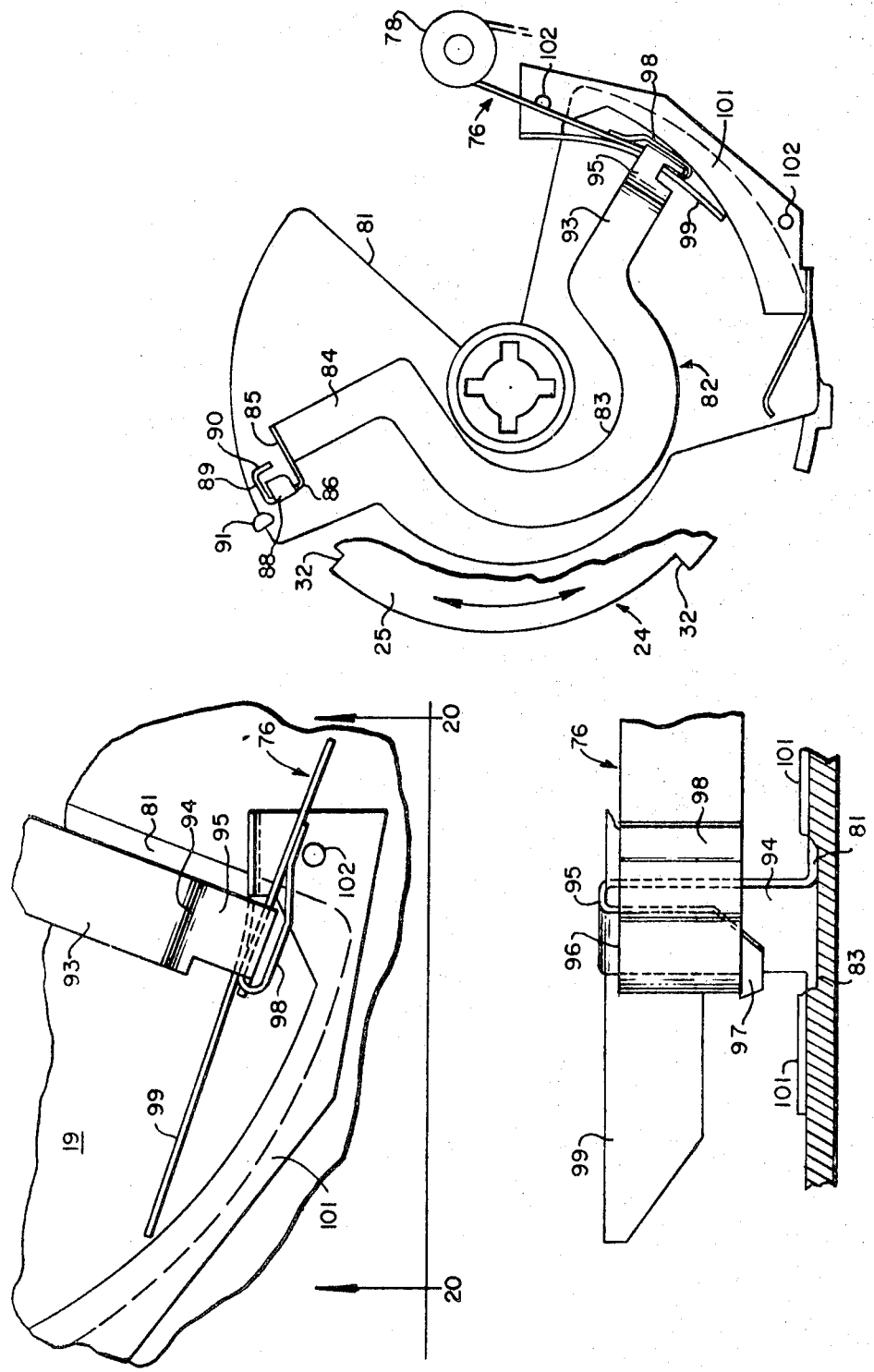

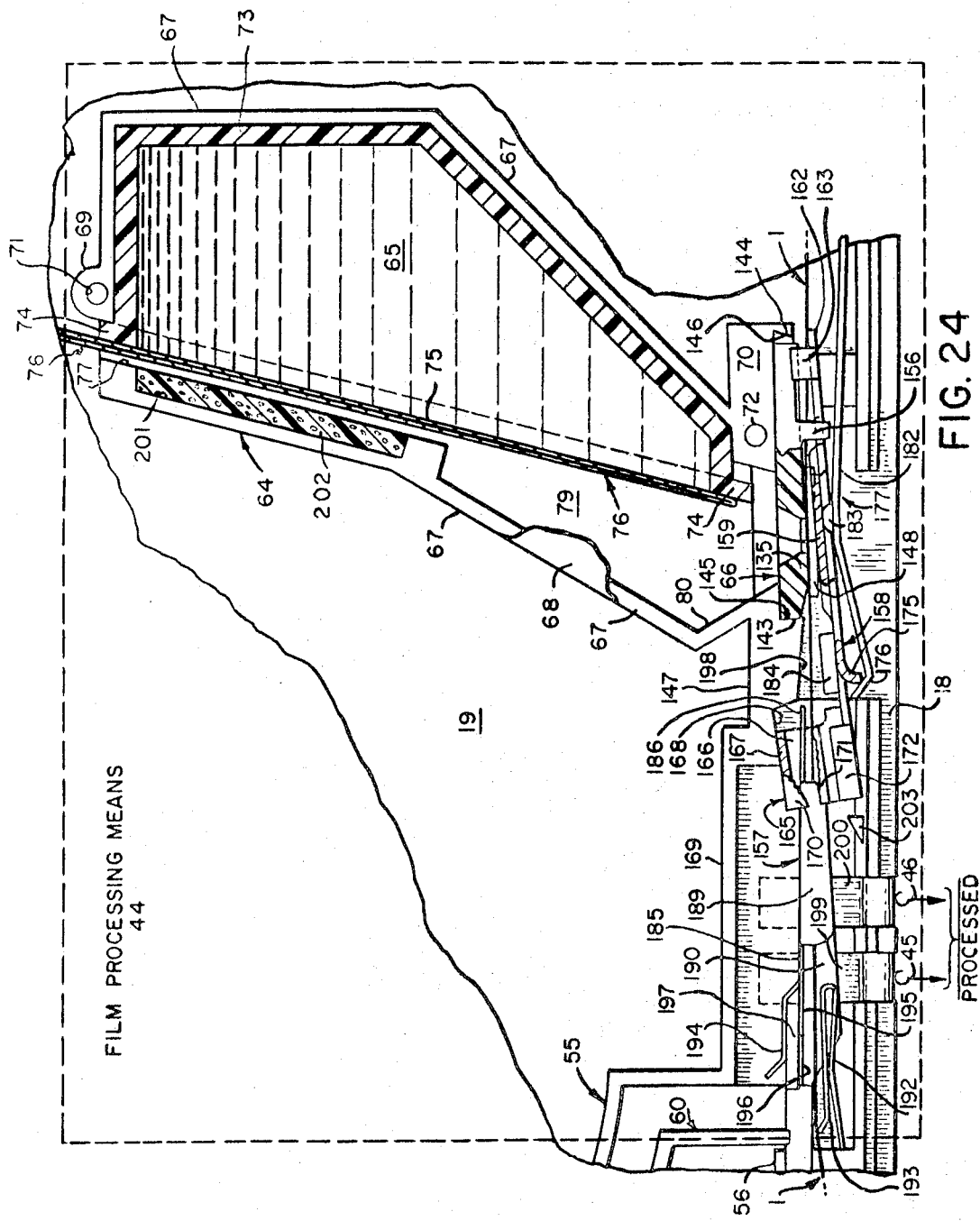

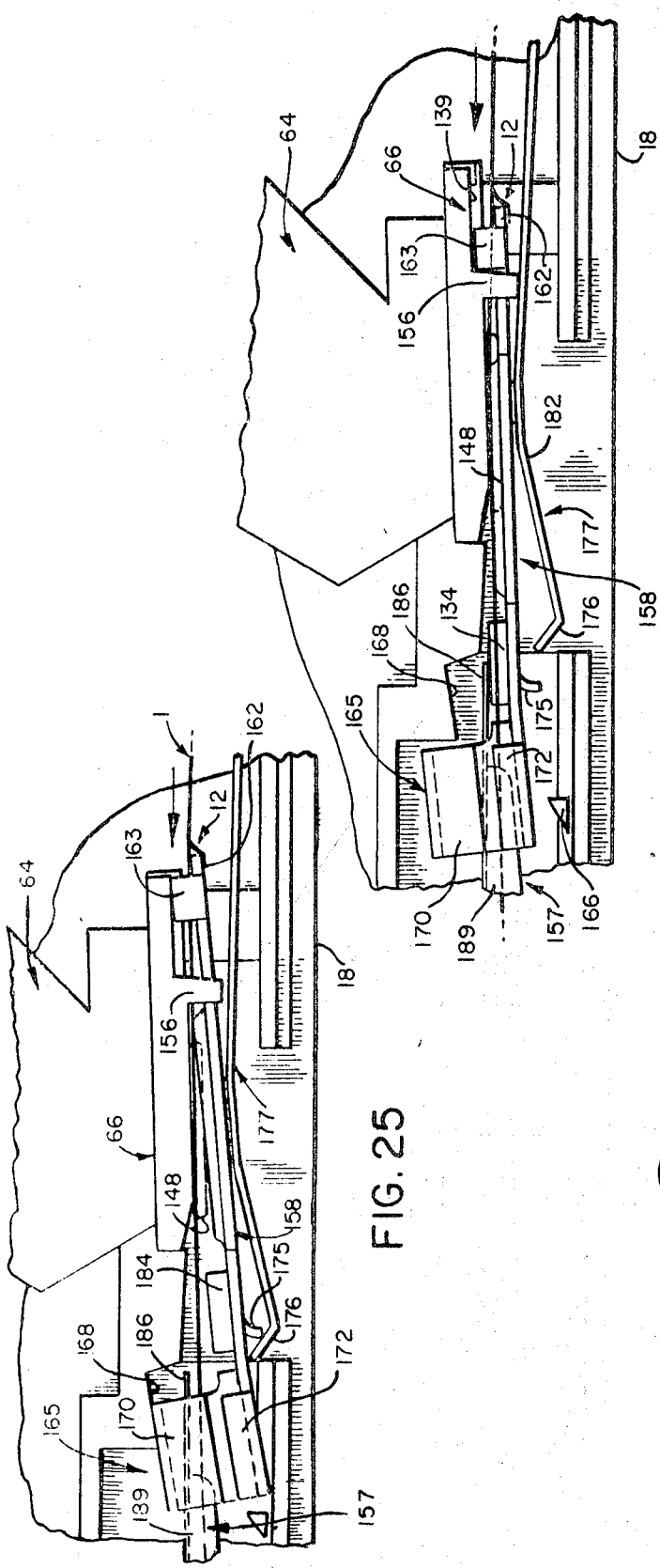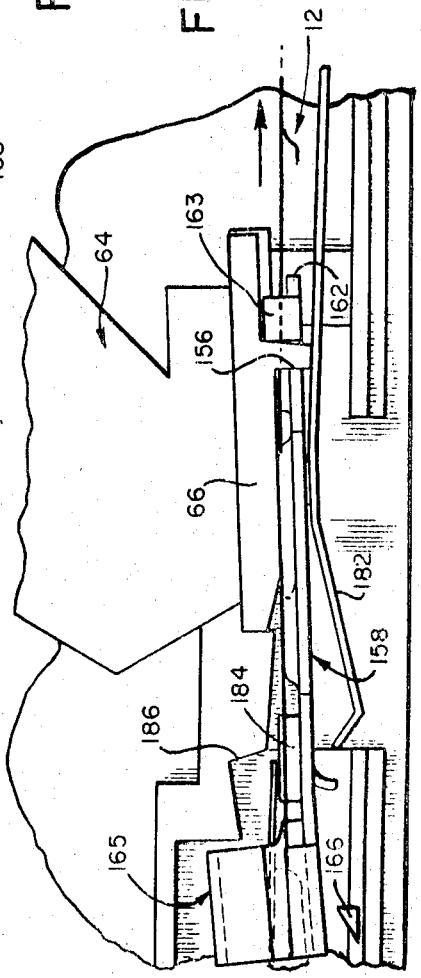
FIG. 25
FIG. 26
FIG. 27

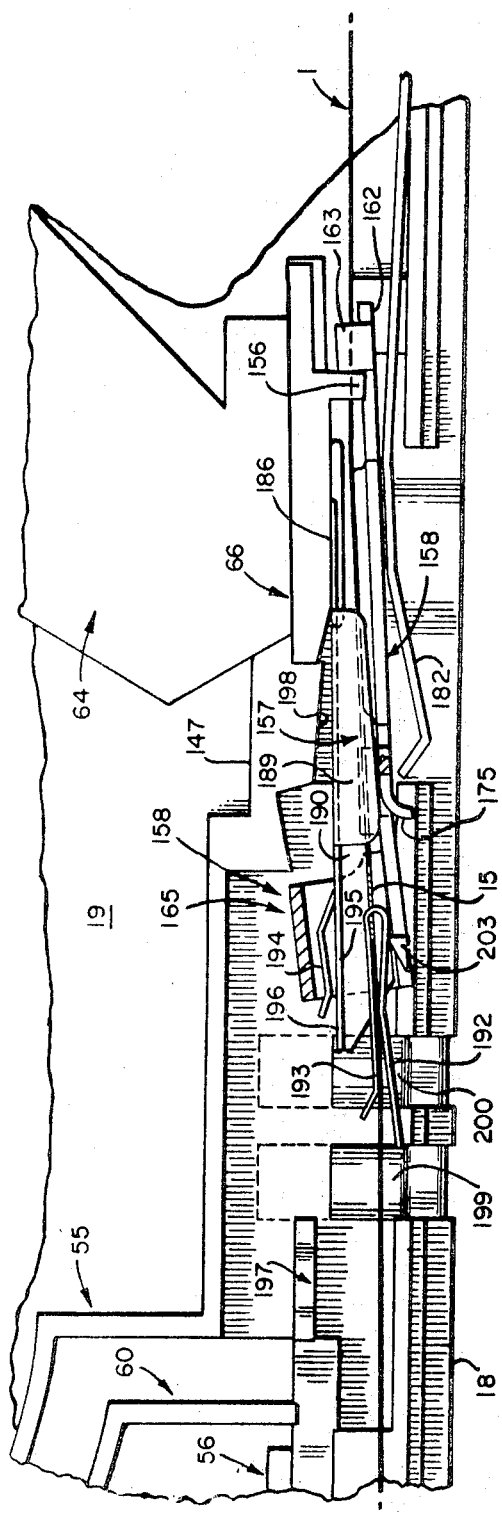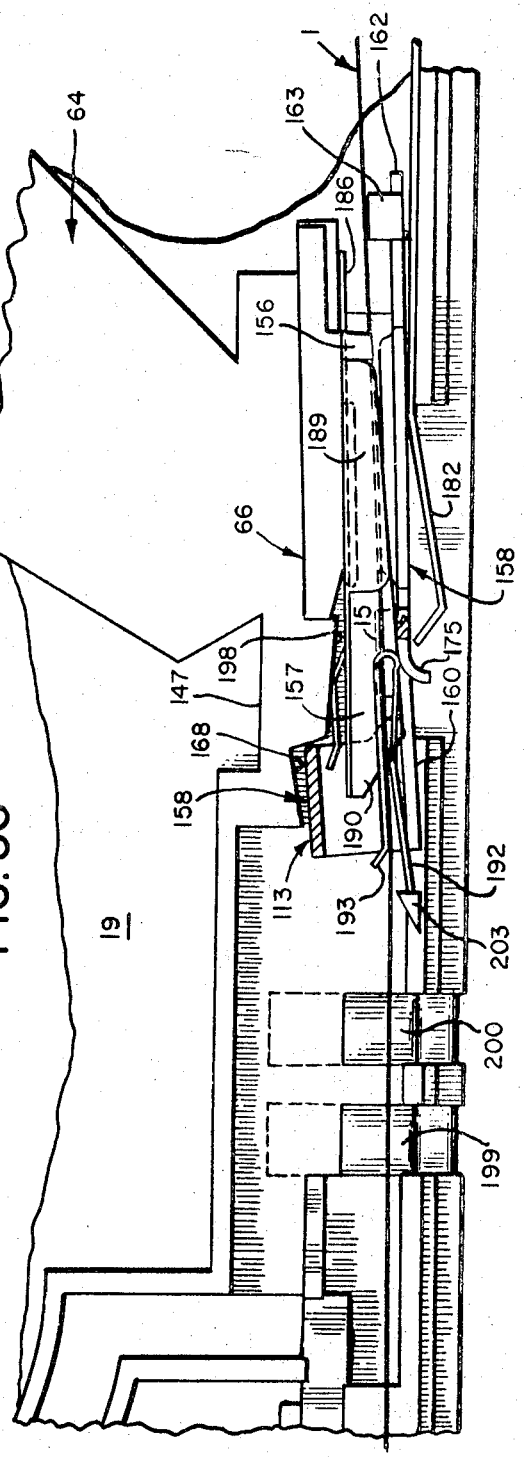

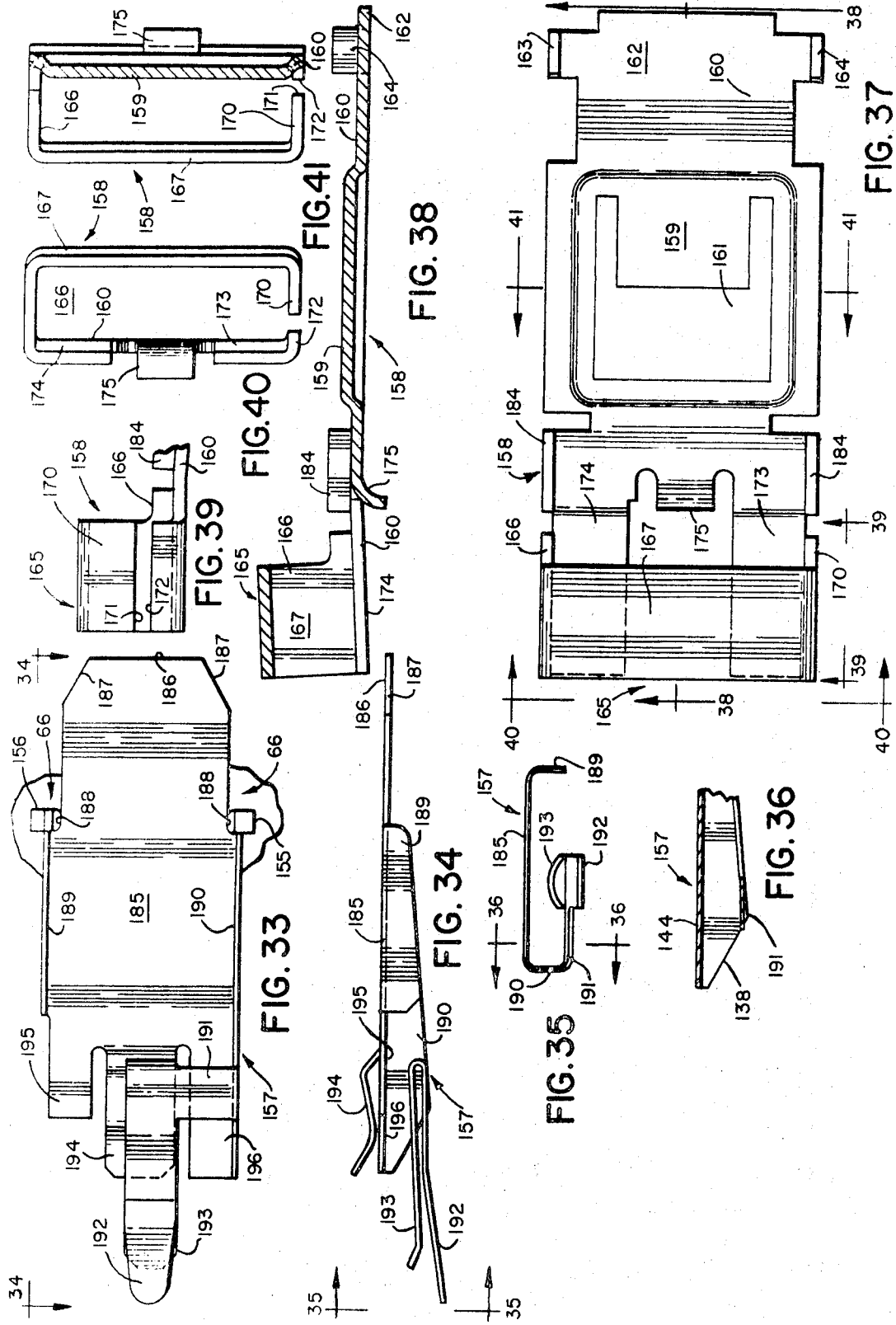

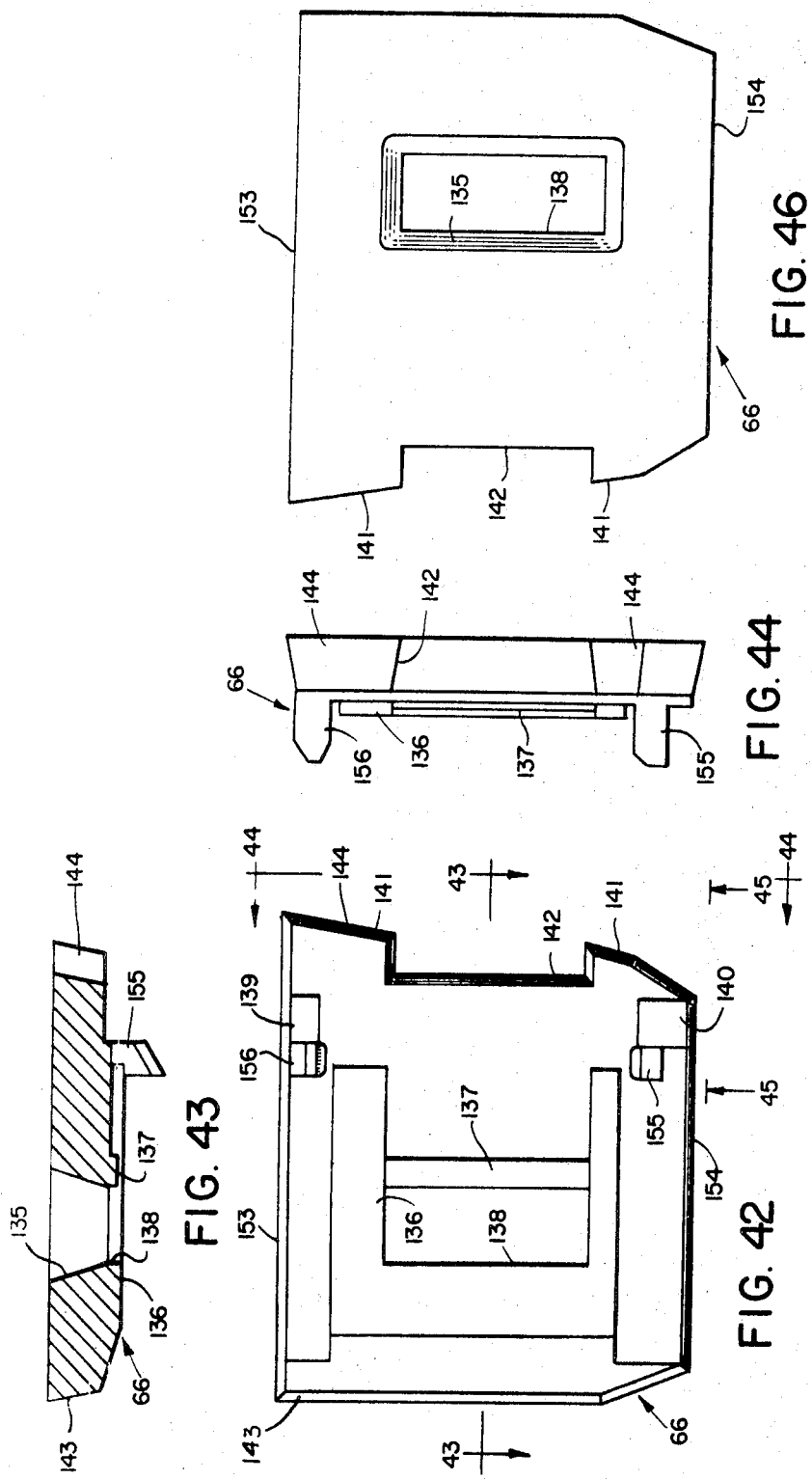

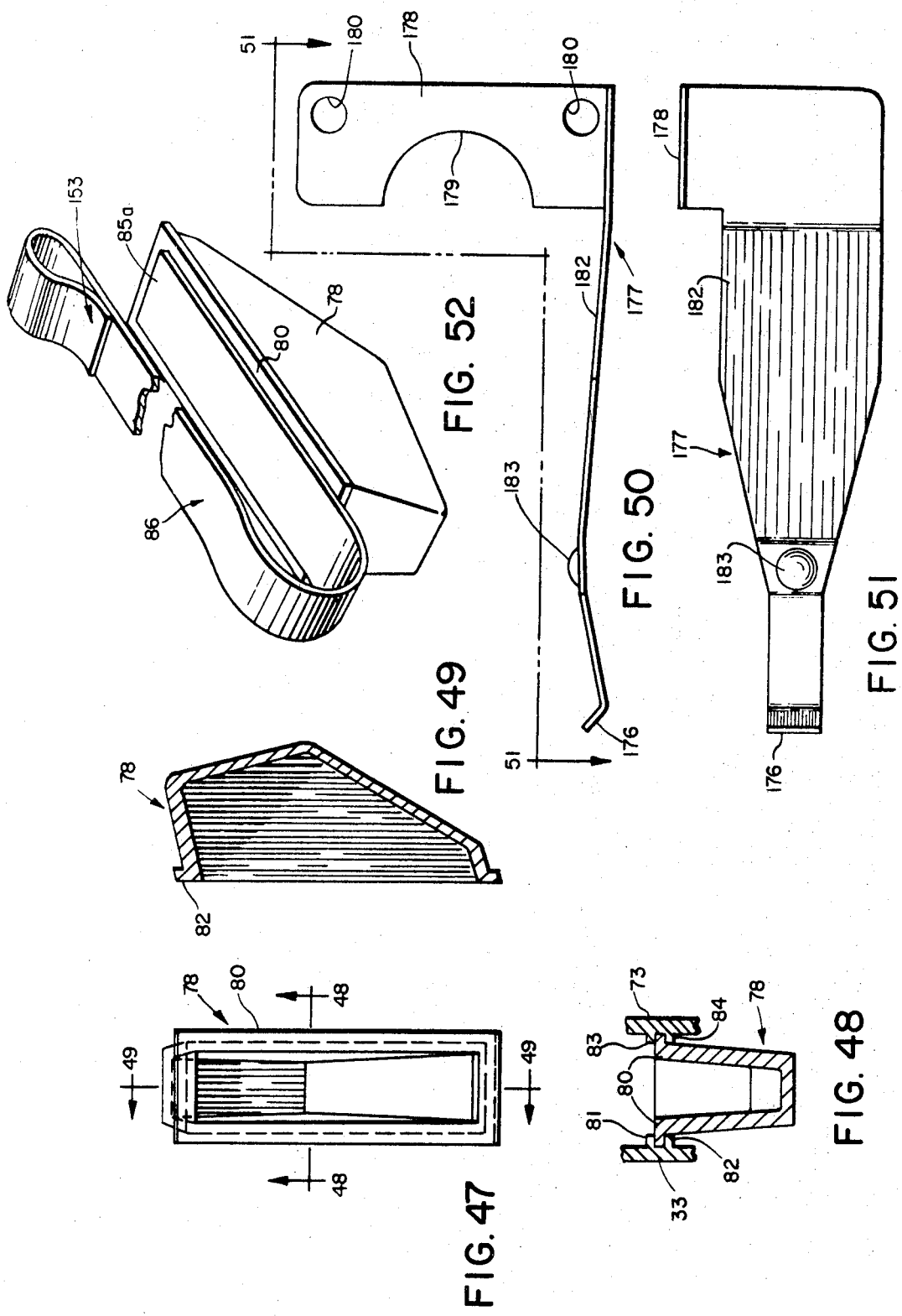

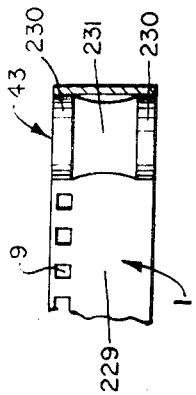
FIG. 55
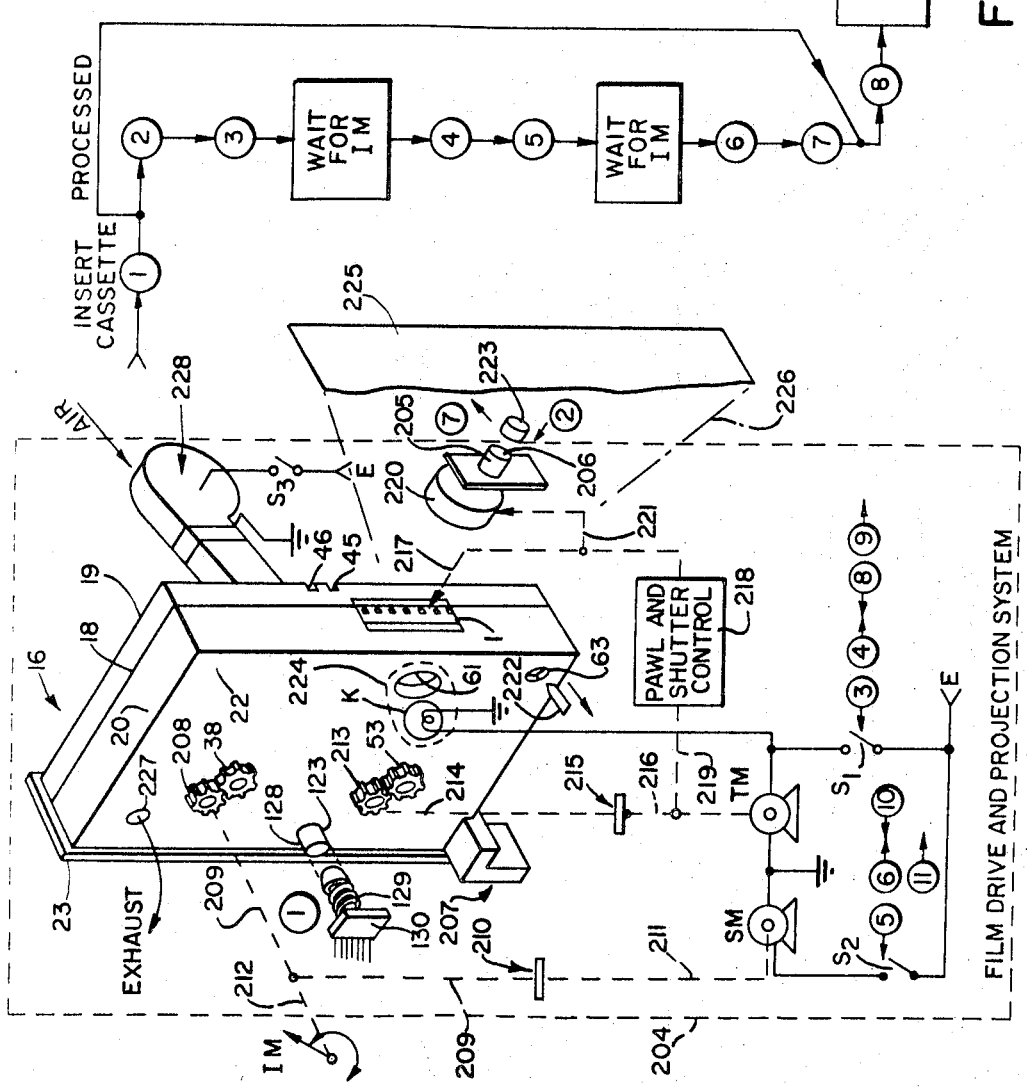
FIG. 54
FIG. 53

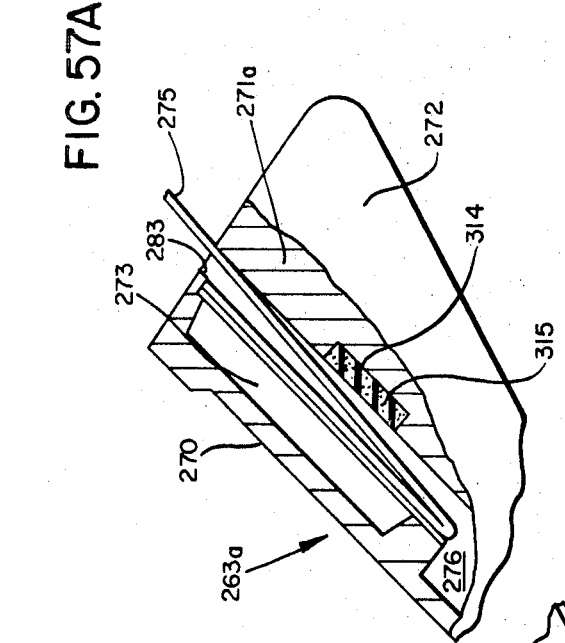
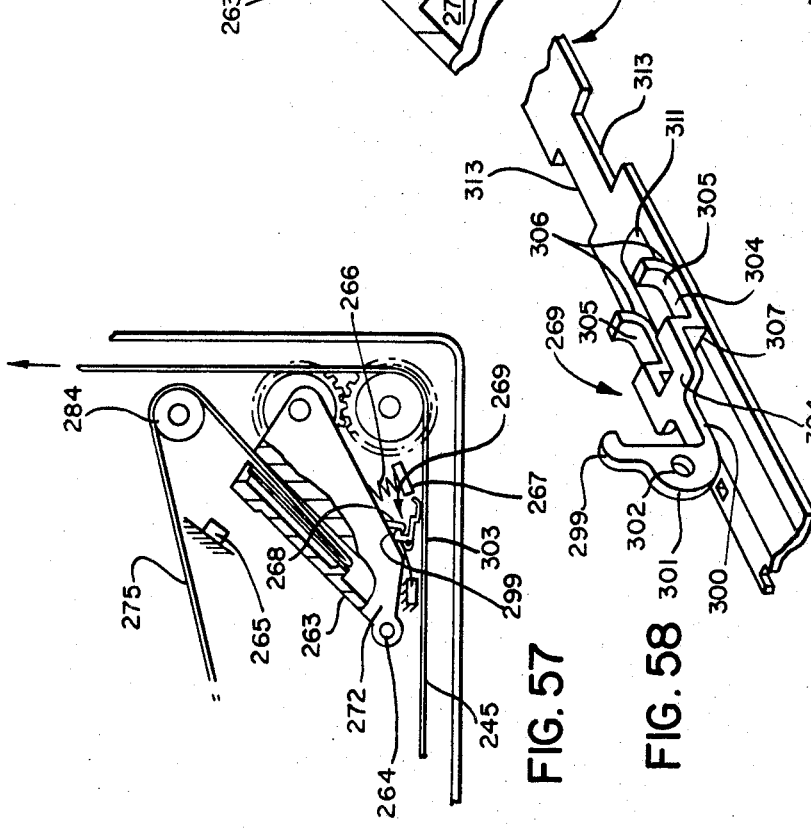
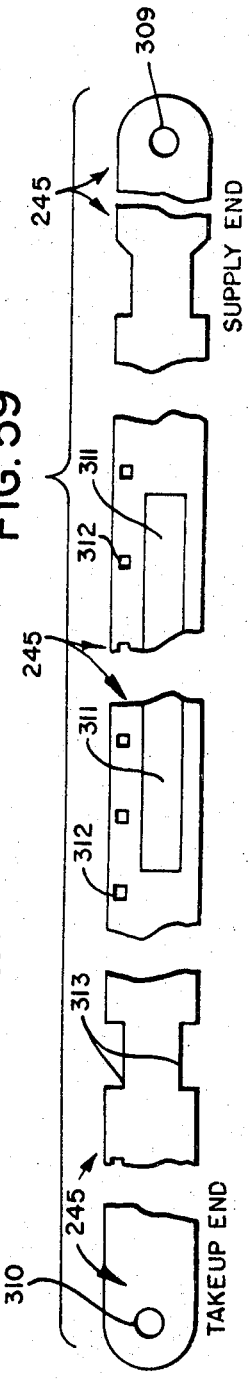

PROCESSING COMPOSITION RELEASE MECHANISM FOR FILM CASSETTE COMPRISING SELF-CONTAINED FILM PROCESSING SYSTEM

This is a division of application Ser. No. 227,092, filed Feb. 17, 1972, now U.S. Pat No. 3,785,725.

This invention relates to photography, and particularly to a novel processing composition release mechanism for a film cassette comprising a self-contained film processing system.

A widely accepted advance in the photographic arts has been the creation of simple and convenient photographic systems in which the camera and darkroom are combined, in a compact assembly permitting either professional or amateur to produce gratifying photographic results within seconds after an exposure is made. In such apparatus, the camera is arranged to accept a package containing not only photosensitive material, for forming latent images in the camera, but photofinishing materials for producing finished black and white or color prints from the latent images immediately following their exposure. It has thus become a simple matter to produce prints of excellent quality.

It would be highly desirable to extend this facility to the production of photographic transparencies for projection, and particularly, to the production of motion pictures. One approach to this goal has been the development of film cassettes for use in the production of motion pictures, especially in the 8 mm format preferred by the amateur for reasons of economy and the inherent compactness of the equipment required to handle it.

Specifically, a film cassette of the kind described comprises an opaque housing containing a roll of film that is initially disposed primarily on a supply reel, and extends therefrom to a takeup reel, both reels being rotatably mounted in the housing. Between the reels, the film passes through a film gate comprising a pair of spaced light-baffled apertures in the housing, for cooperation with a camera to produce a series of latent images on the film as it is advanced onto the takeup reel from the supply reel. Adjacent the film gate is mounted a prism through which light can be directed through finished images on the film for projection thereof.

Also located within the housing is a supply of processing composition for the film, together with an applicator for coating the film with the processing composition after its exposure. The coating process is desirably carried out in response to external energy supplied to manipulate the reels on which the film is wound, acting through programming apparatus located within the cassette which serves to connect the film processing apparatus to the film and carry it through a prescribed sequence of operations.

In contrast to the apparatus which has been developed for still photography, for the purpose of producing transparencies, and particularly those adapted for use in motion picture photography, it is desirable that all of the film be exposed before any of it is processed, and that the entire length of film be continuously processed following its exposure. For that purpose, it is necessary to include in the cassette a charge of processing composition adequate to process the roll of film, in an initially sealed container.

In order to further the purpose of allowing the process sequencing apparatus to be contained within the cassette, the mechanism relied upon for opening this sealed container must require the application of only such forces as can reasonably be applied through the film transport mechanism. On the other hand, it is desirable to prevent any of the functions of the processing apparatus from being inadvertently performed in response to other forces acting on the cassette, as during handling incident to insertion in or removal from the camera, or in the film drive and projection apparatus subsequently used after exposure to carry out the processing operation and project the processed film.

The objects of this invention are to provide a simple and reliable mechanism for releasing film processing composition within a cassette, at the proper time and in response to the manipulation of the storage reels on which the film is disposed. Further objects are to increase the reliability of film process programming apparatus adapted to be located within a replaceable film cassette, and to reduce the probability of contamination of the apparatus or of the processed film by any unused processing composition that fails to find its way to the photosensitive surface of the film during the processing operation.

Briefly, the above and other objects of the invention are attained by a novel film cassette construction incorporating a self-contained processing system. Each such cassette contains a roll of film, connected at its ends to supply and takeup reels journalled for rotation in an opaque housing, and passing therebetween through a film gate formed in the housing for cooperation with a camera and a film drive and projection system. As supplied to the user, the film in the cassette is initially unexposed, and is disposed substantially on the supply reel. A film processing system is located within the cassette, and initially comprises a sealed container of processing composition, together with means for releasing the composition, and coating apparatus for applying the released composition in a uniform coat to the film.

In accordance with the preferred embodiment of the invention, the processing fluid in the cassette is initially sealed in a container which comprises a receptacle open at one side, and enclosed on the open side by one end of a strip of flexible material sealed thereto. The flexible sealing strip extends to a connection with an actuating element that is movable to detach at least a portion of the sealing end of the strip, and thereby release the processing composition.

The actuating element may comprise an arm movably mounted in the cassette adjacent one of the reels on which the film is wound, and having one end connected to the tear strip. On an opposite end of the arm is formed a cam that is adapted to engage cooperating teeth formed on the rims of one of the spools, when the arm is in a reel-engaging position and when the reel is rotated in a predetermined direction.

Preferably, the arm is initially retained in an inactive position by a detent. The detent is adapted to be released by a cam movably mounted in the cassette and arranged to be selectively actuated by a force applied through the housing to enable the release mechanism just before it is desired to process the film. By that arrangement, the premature activation of the processor, or the inadvertent performance of its functions, is prevented until such operation is desired.

In accordance with the preferred embodiment of the invention, functions other than the release of processing composition in the processing system located in the cassette are programmed by singularities formed on the film strip that engage actuating elements in the housing to provide both information signals and process control energy for sequencing the processing system through a cycle of operation in response to manipulation of the supply and takeup reels by the film drive and projection system.

In accordance with a particular and presently preferred embodiment of the invention, the initially sealed container of processing composition is located within an outer container that serves to dispense released composition to the applicator for coating to a predetermined thickness on the film. The tear strip for releasing the composition when desired extends through an aperture in this outer container to the release mechanism described above. Preferably, this aperture is formed with a recess containing a pad of absorbent material which will swell upon contact with any processing composition that tends to escape through the aperture, and thereby seal the aperture after release of the composition to prevent contamination of the interior of the cassette, and of the film and movable parts located therein, following release of the processing composition.

It is preferred to carry out the processing operation subsequent to exposure of the film in a cassette in accordance with the invention in the environment of an especially adapted film drive and projection system which will cause the film to be manipulated within the cassette in a sequence adapted to carry out the processing program established by the apparatus within the cassette. Specifically, this programmed process operating cycle commences with the engagement of the processing apparatus with the film prior to the release of the film processing composition, as the film is transported in a first direction. Then, when the film is transported in an opposite direction, the processing composition is released to coat the film while the film moves past the coating apparatus.

To facilitate this programmed operation, the preferred film drive and projection system includes drive apparatus for the supply and takeup reels in the cassette, together with cyclic sequential drive control means. The drive control means are effective upon the application of an operation initiating signal to cause the drive apparatus to first advance the film onto the takeup reel, and thereafter to rewind it onto the supply reel. The drive control apparatus then awaits a further signal before preceeding to repeat this cycle.

In accordance with one feature of the apparatus of the invention in its preferred embodiment, the cassette provides a mode control signal that is indicative of the processed or unprocessed state of the film in the cassette. This signal may be employed to select one of two modes of operation for the film drive and projection system. In a first mode of operation, carried out when a cassette containing unprocessed film is inserted into the film drive and projection system, the system provides a lighttight environment for the film in the cassette while the drive apparatus is carried through one cycle as described above. The film drive and projection apparatus is provided with a light source, for directing light through a portion of film exposed in the film gate of a cassette toward a projection aperture. In the projection aperture, there is mounted a lens through which an image of the light transmitted through the film is focused on a suitable viewing screen.

The projection aperture is provided with a conventional film projection shutter synchronized with the film drive pawl, and also with a blinder operable to close the projection aperture during film processing. During operation of the system in response to the insertion of a cassette containing unprocessed film, the blinder is closed and the light extinguished to provide the desired lighttight environment for processing.

Following processing, the drive cycle is repeated, but with the light on and the shutter open during film advance onto the takeup reel, so that the film just processed is projected. After projection, the film is rewound onto the supply reel.

When a cassette containing previously processed film is inserted into the film drive and projection system, a second mode of operation is caused to occur. In that mode, the film drive apparatus operates through only one cycle, during at least the projection portion of which the lamp is energized and the blinders open, so that the film is projected, and then rewound for storage and later reuse.

The above and other features of the invention, together with the manner in which the components of the cassette of the invention are constructed, and their mode of operation, will best be understood in the light of the following detailed description, together with the accompanying drawings, of various illustrative embodiments thereof.

In the drawings,

FIG. 1 is a fragmentary schematic plan sketch of a strip of film usable in the cassette of the invention, as seen from the base side;

FIG. 2 is a fragmentary schematic plan sketch, with parts omitted, parts shown in cross section, and parts broken away, of a cassette in accordance with the invention;

FIG. 5 is a fragmentary schematic plan view, with parts omitted and parts broken away, of a portion of the cassette of FIG. 2;

FIG. 6 is a plan view of a tear strip actuating arm forming a portion of the apparatus of FIG. 5;

FIG. 7 is an elevational view of the apparatus of FIG. 6;

FIG. 8 is a fragmentary end view, taken substantially along the lines 8—8 in FIG. 6;

FIG. 9 is a fragmentary elevational view, taken substantially along the lines 9—9 in FIG. 6;

FIG. 10 is a fragmentary end view of the apparatus of FIG. 6, taken substantially along the lines 10—10 in FIG. 6;

Figure 12:
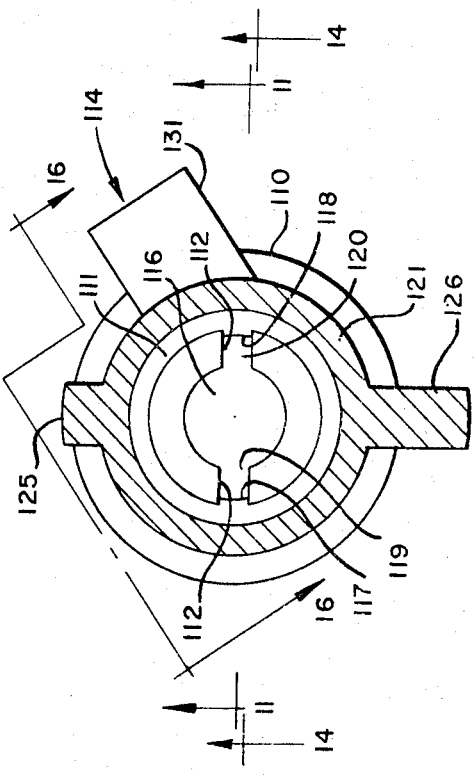
FIG. 12 is a cross sectional plan view of the apparatus of FIG. 11, taken substantially along the lines 12—12 of FIG. 11.
Figure 23:
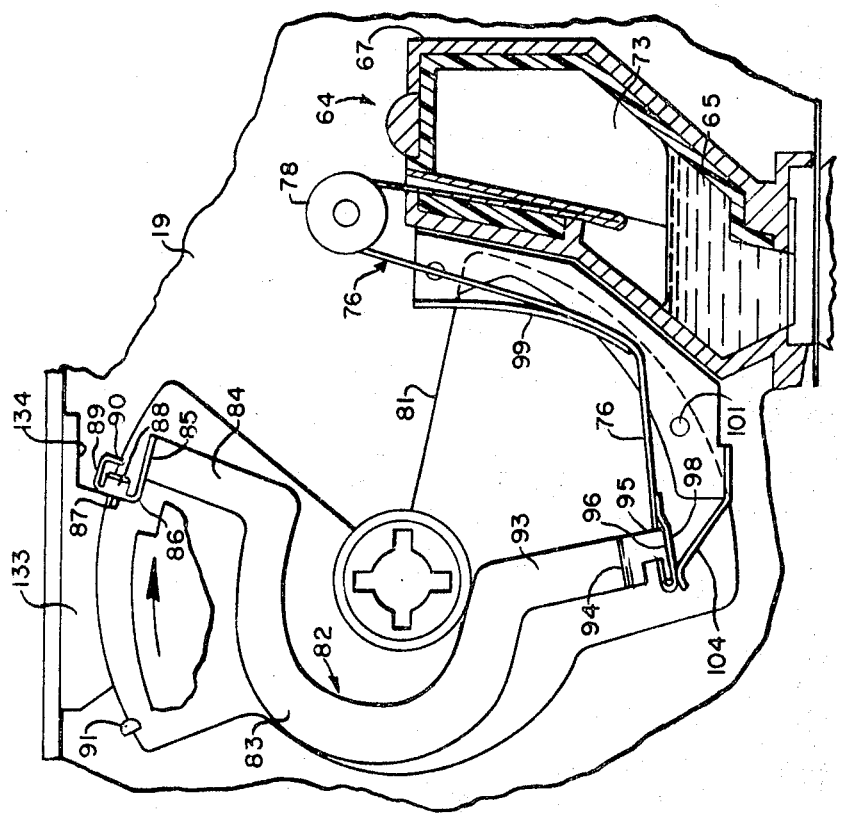
Figure 22:
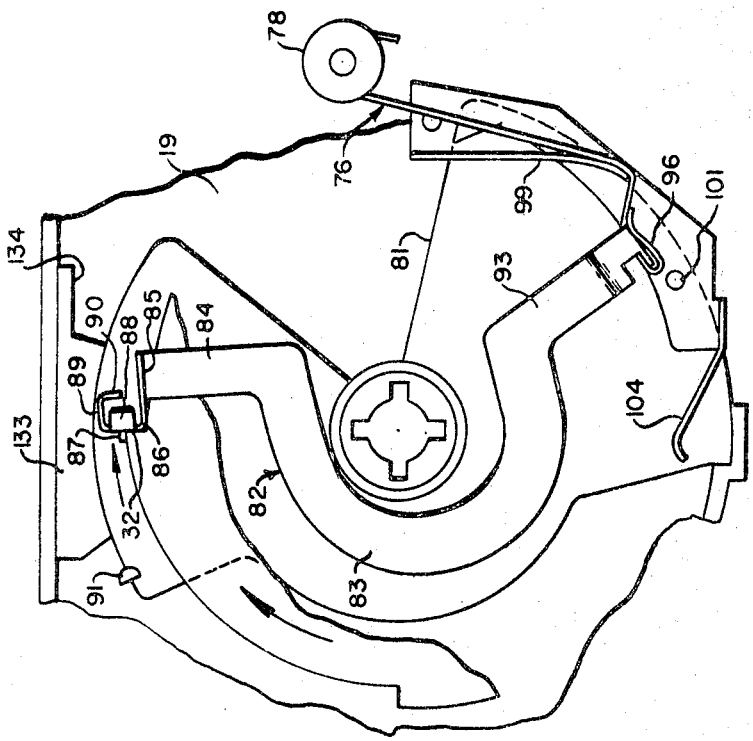
Figure 56:
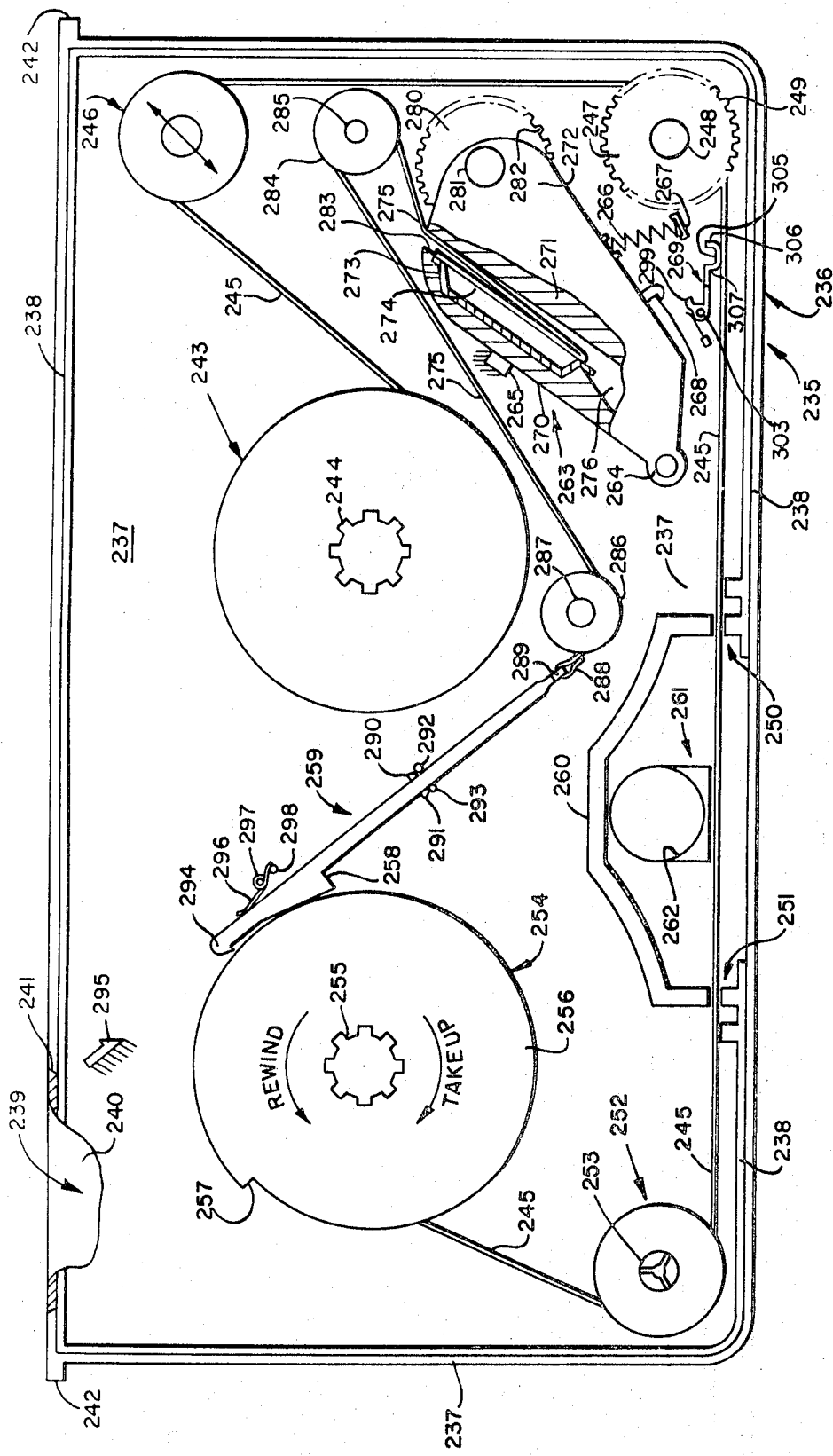
Figure 60:
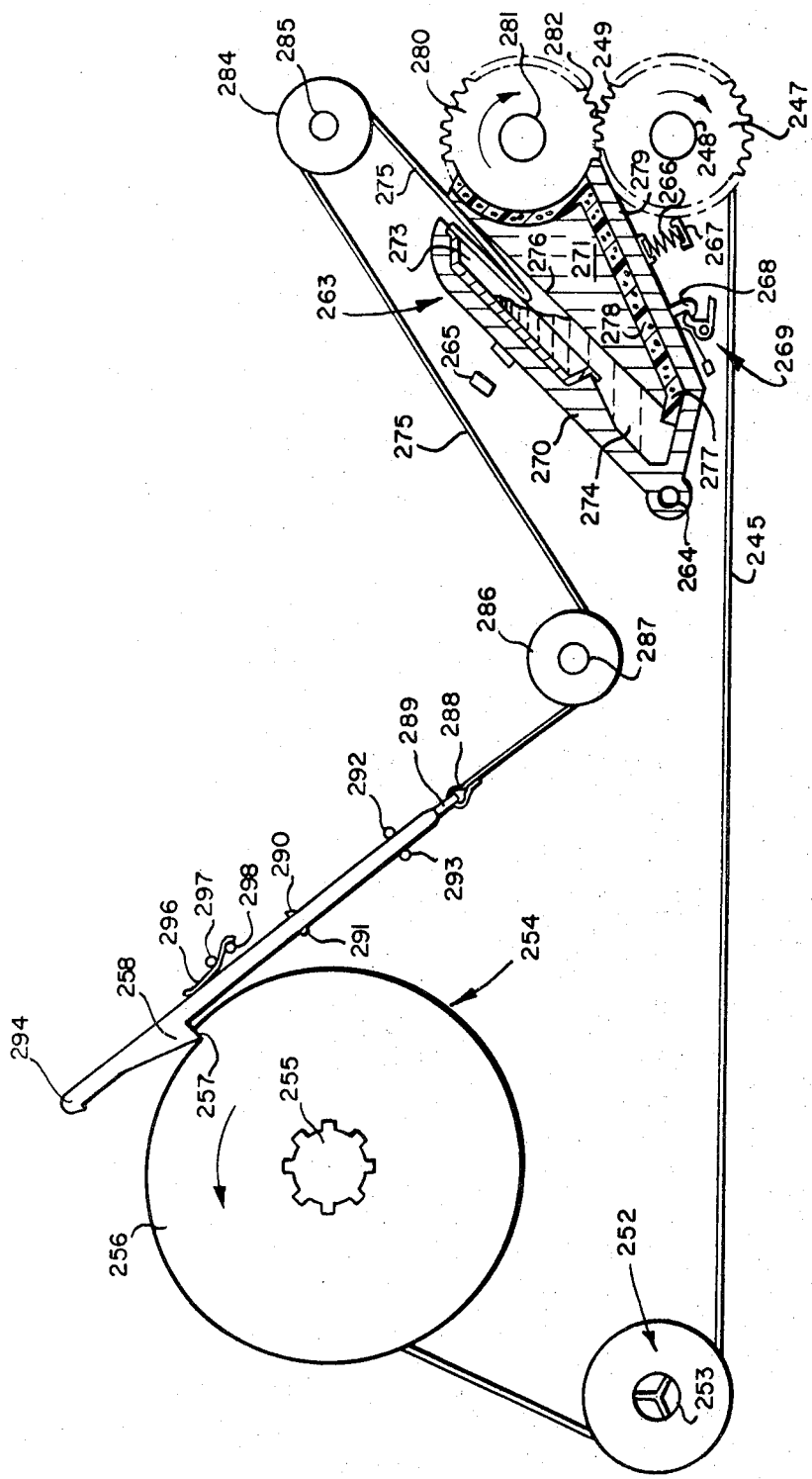
Figures 61, 61A:
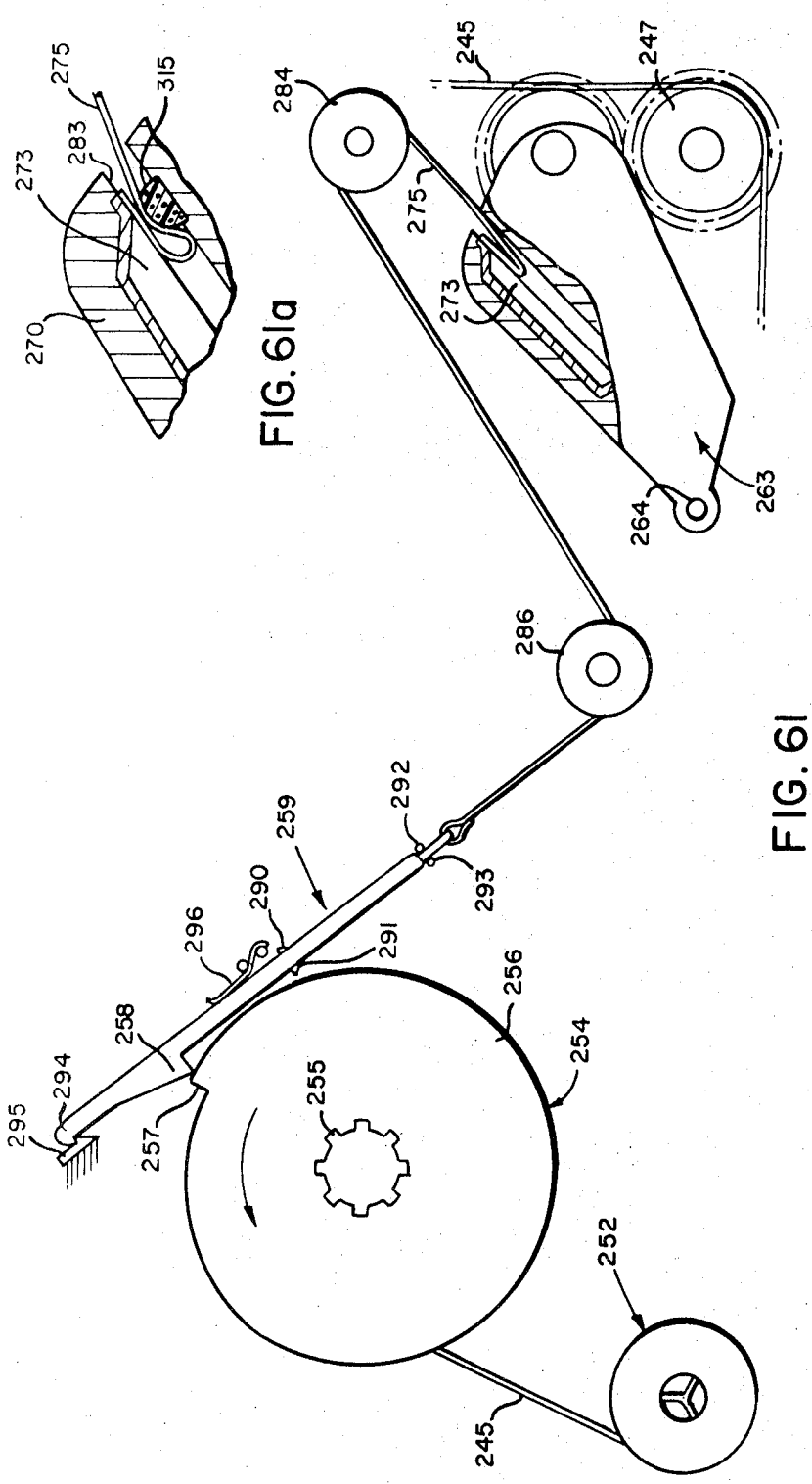
Figure 63:
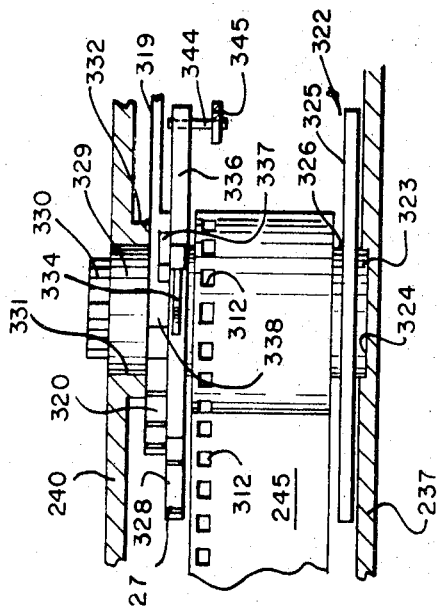
Figure 62:
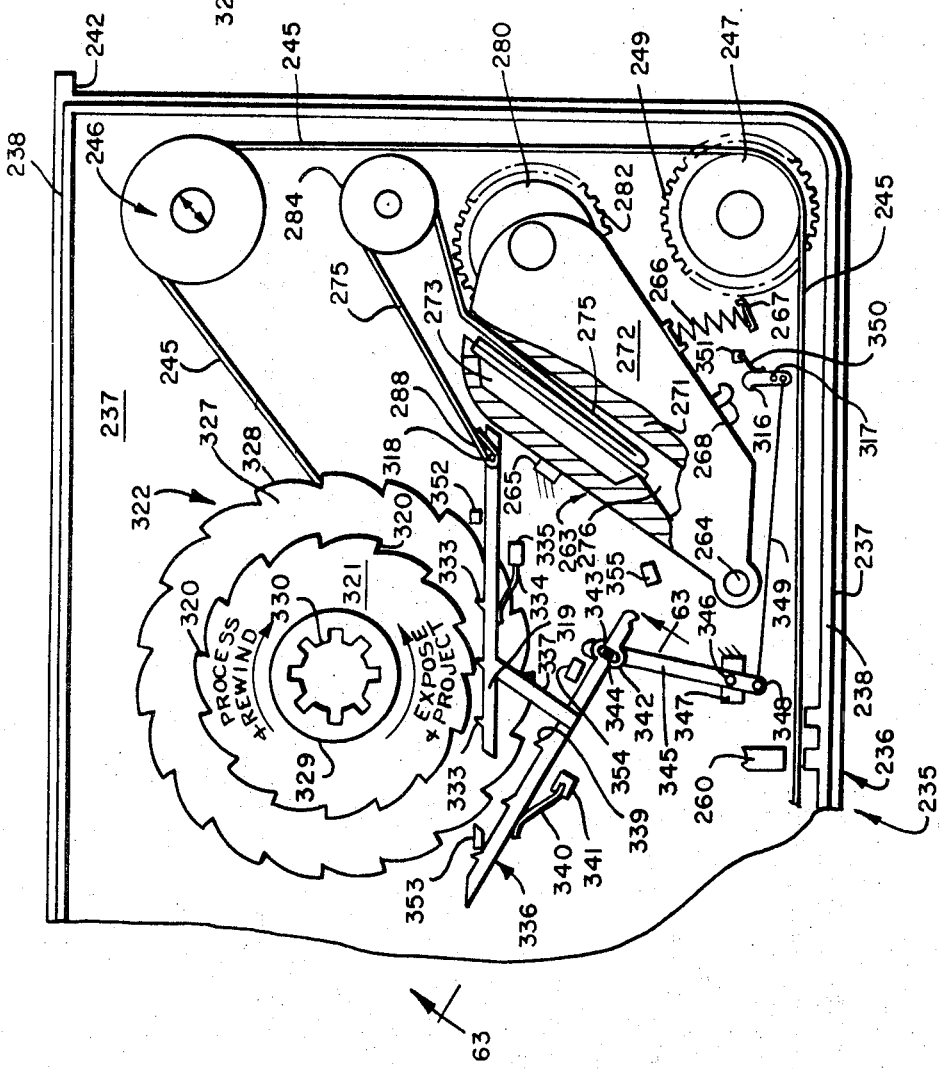
Figure 64:
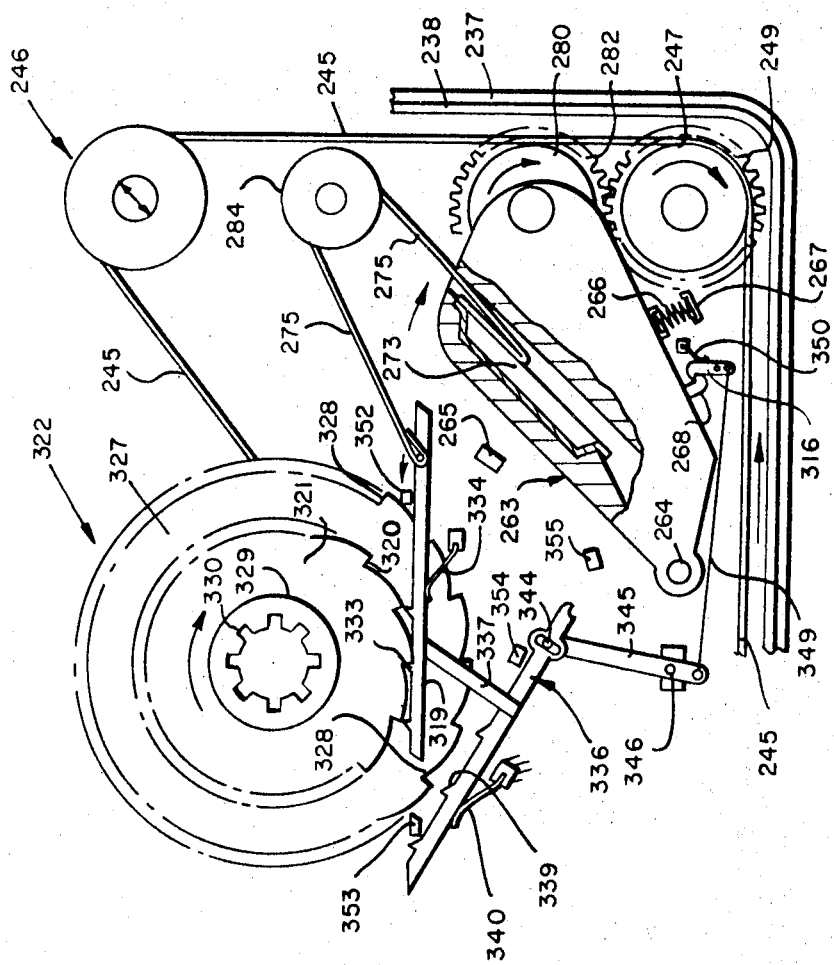
Figure 65:
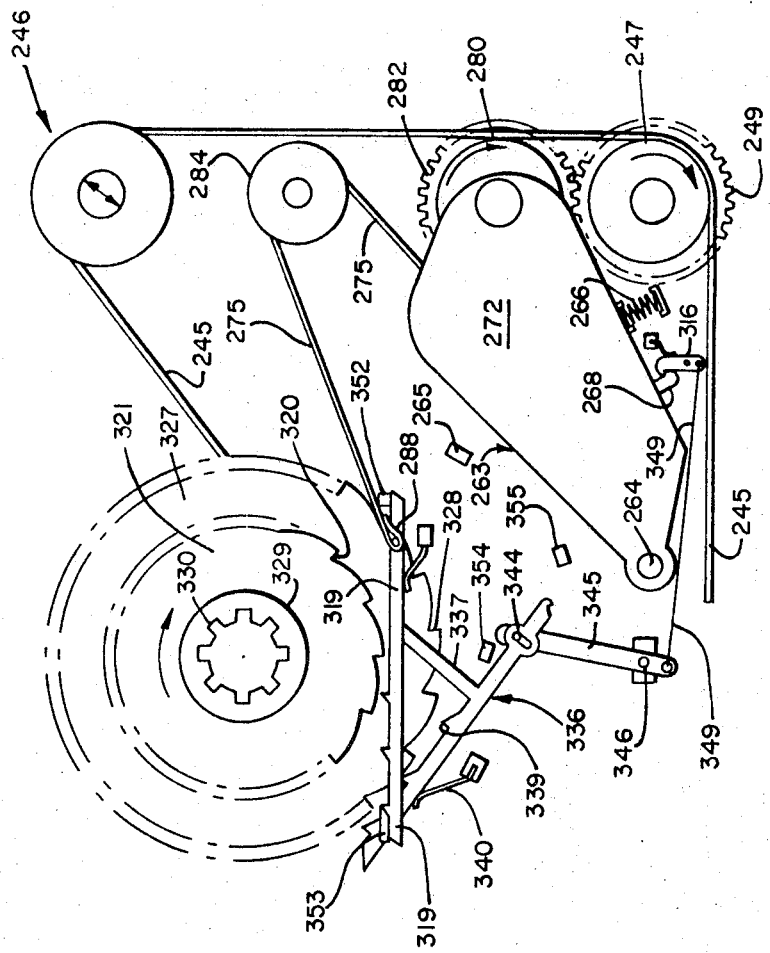
Figure 66:
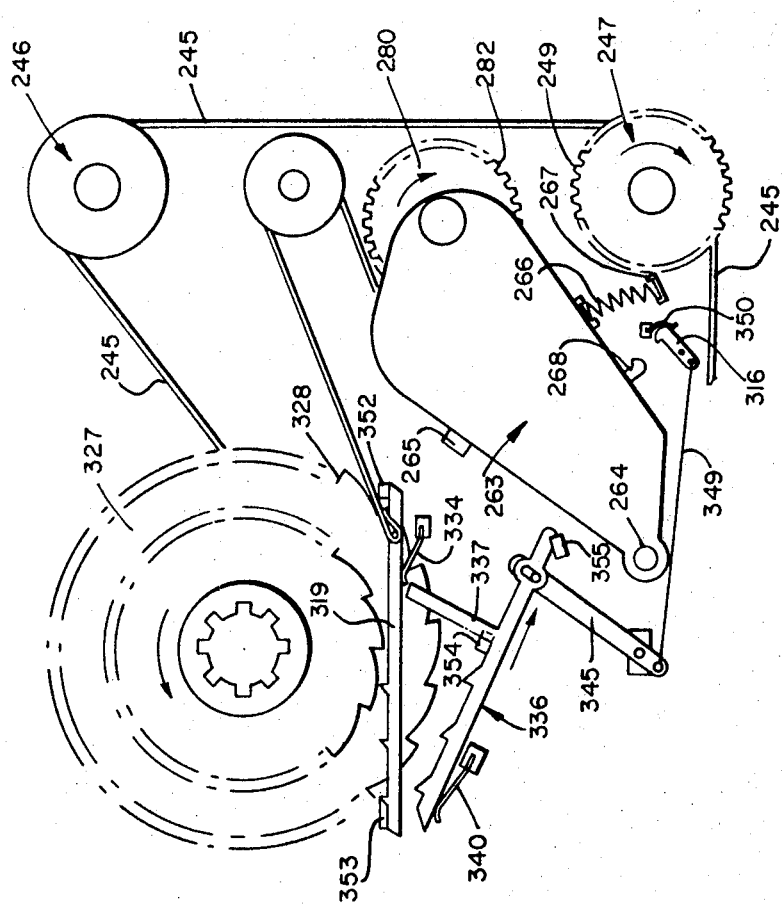

FIGS. 16a and 16b comprise elevational views of the apparatus of FIG. 12, each taken substantially along the lines 16—16 in FIG. 12, but showing the parts in two different positions and in conjunction with the actuating arm of FIGS. 6–10;

FIG. 17 is a plan view of a spring and mounting assembly forming a portion of the apparatus of FIG. 5;

FIG. 18 is an end view of the apparatus of FIG. 17, taken substantially along the lines 18—18 of FIG. 17;

FIG. 19 is a fragmentary schematic sketch, on an enlarged scale, of a portion of the apparatus of FIG. 5;

FIG. 20 is an end view of the apparatus of FIG. 19, taken substantially along the lines 20—20 in FIG. 19, with parts shown in cross section and parts broken away;

FIG. 21 is a schematic plan sketch of a portion of the apparatus of FIG. 5, with parts omitted and parts broken away, showing the apparatus in another position;

FIGS. 22 and 23 are schematic fragmentary plan views, with parts omitted and parts broken away, showing the apparatus of FIG. 5 in still other positions assumed during operation;

FIG. 24 is a fragmentary schematic plan sketch, with parts omitted, parts shown in cross section, and parts broken away, of a portion of the film processing apparatus of FIG. 2 on an enlarged scale and showing additional details;

FIGS. 25–32 are schematic plan sketches, with parts omitted, parts shown in cross section, and parts broken away, showing portions of the apparatus of FIG. 24 in various other positions assumed during the operation of the apparatus;

FIG. 33 is a schematic plan view of a portion ot the processing apparatus of FIGS. 2 and 24, with parts broken away, comprising a combined pressure pad deflection cam and nozzle closure plate shown in its cooperative association with a portion of a coating nozzle;

FIG. 34 is an elevational view of the apparatus of FIG. 33, with the nozzle portions omitted, taken substantially along the lines 34—34 in FIG. 33;

FIG. 35 is a schematic end view of the apparatus of FIG. 34, taken substantially along the lines 35—35 in FIG. 34;

FIG. 36 is a schematic fragmentary cross sectional view of the apparatus of FIG. 35, taken substantially along the lines 36—36 in FIG. 35;

FIG. 37 is a schematic plan view of a pressure pad comprising a portion of the apparatus of FIG. 24;

FIG. 38 is a schematic cross sectional view of the pressure pad of FIG. 37, taken substantially along the lines 38—38 in FIG. 37;

FIG. 39 is a schematic fragmentary elevational view of a portion of the apparatus of FIG. 37, taken substantially along the lines 39—39 in FIG. 37;

FIG 40 is a fragmentary end view of a portion of the apparatus of FIG. 37, taken substantially along the lines 40—40 in FIG. 37;

FIG. 41 is a schematic cross sectional end view of a portion of the apparatus of FIG. 37, taken substantially along the lines 41—41 in FIG. 37;

FIG. 42 is a schematic plan view of a coating nozzle forming a part of the apparatus of FIGS. 2 and 24;

FIG. 43 is a schematic cross sectional view of the nozzle of FIG. 42, taken substantially along the lines 43—43 in FIG. 42;

FIG. 44 is a schematic end view of the nozzle of FIG. 42, taken substantially along the lines 44—44 in FIG. 42;

FIG. 45 is a fragmentary elevational view of a portion of the nozzle of FIG. 42, taken substantially along the lines 45—45 in FIG. 42;

FIG. 46 is a plan view of the other side of the apparatus of FIG. 42;

FIG. 47 is a schematic plan view of a receptacle forming a part of the apparatus of FIGS. 2 and 24;

FIG. 48 is a schematic cross sectional view of the apparatus of FIG. 47, taken substantially along the lines 48—48 in FIG. 47 and showing in addition the cooperation of the receptacle with wall members forming a part of the apparatus of FIG. 24;

FIG. 49 is a cross sectional view of the apparatus of FIG. 47, taken substantially along the lines 49—49 in FIG. 47;

FIG. 50 is a schematic plan view of a spring forming a part of the apparatus of FIGS. 2 and 24;

FIG. 51 is an elevational view of the apparatus of FIG. 50, taken substantially along the lines 51—51 in FIG. 50;

FIG. 52 is a schematic fragmentary perspective sketch illustrating a sealed container and tear tab construction, suitable for use in the apparatus of FIG. 2;

FIG. 53 is a schematic block and wiring diagram, illustrating the cassette of our invention in association with film drive and projection apparatus;

FIG. 54 is a schematic flow sheet illustrating the sequence of operations of the apparatus of FIG. 53;

FIG. 55 is a fragmentary schematic cross sectional sketch illustrating the construction of a roller forming a portion of the apparatus of FIG. 2;

FIG. 56 is a fragmentary schematic plan sketch, with parts omitted, parts shown in cross section, and parts broken away, of a cassette in accordance with a modification of the invention;

FIG. 57 is a fragmentary schematic plan sketch, with parts omitted, parts shown in cross section and parts broken away, showing a portion of the apparatus of FIG. 56 in a second position assumed during operation;

FIG. 57a is a fragmentary schematic plan sketch, with parts shown in cross section, parts omitted and parts broken away, of a portion of the apparatus of FIG. 56 modified to incorporate a feature of the invention;

FIG. 58 is a fragmentary schematic perspective sketch of a hook forming a portion of the apparatus of FIGS. 56 and 57, shown in association with a fragment of the film strip;

FIG. 59 is a fragmentary schematic plan sketch, with parts broken away, showing a film strip suitable for use in the apparatus of FIGS. 56 and 57 as seen from the emulsion side;

FIGS. 60 and 61 comprise fragmentary schematic plan sketches, with parts omitted, parts shown in cross section, and parts broken away, showing the apparatus of FIGS. 56 and 57 in still other positions assumed during operation;

FIG. 61a comprises a schematic fragmentary plan sketch, with parts omitted, parts shown in cross section, and parts broken away, of the modification of FIG. 57a in the final state assumed following the processing operation carried out by the apparatus of FIGS. 56, 57, 60 and 61;

FIG. 62 is a fragmentary schematic plan sketch, with parts omitted, parts shown in cross section, and parts broken away, illustrating the film processing section of a cassette in accordance with still another embodiment of the invention;

FIG. 63 is a schematic elevational view, with parts omitted, parts shown in cross section, and parts broken away, taken substantially along the lines 63—63 in FIG. 62; and FIGS. 64—66 comprise schematic fragmentary plan sketches, with parts omitted, parts shown in cross section, and parts broken away, of the apparatus of FIG. 62, showing further stages in the operation of that apparatus.

The photographic system of the invention preferably makes use of a photofinishing process in which a strip of film, following exposure in the camera, is contacted with a single processing composition to form a finished transparency from the latent image or images formed on the film during its exposure. The physical construction of such film, the nature of the photosensitive coating thereon, and suitable processing compositions therefor, will next be discussed in connection with FIG. 1.

Referring to FIG. 1, there is shown a film strip generally designated 1, which comprises a leader 2 terminating at an end formed with an aperture such as 3. The aperture 3 serves to connect that end of the film to a takeup reel to be described.

Behind the leader, which may be in the neighborhood of 18 inches in length, there is a strip 4 of photographically useful film, upon which projectable images may be formed. The strip 4 may be, for example, approximately 52 feet in length for 8 mm film.

Following the photographically useful portion of the film is a trailer region generally designated 5. The trailer 5 terminates at another end formed with an aperture 6 by means of which that end of the film is adapted to be connected to a supply reel, to be described.

The film 1 may comprise a base of any suitable transparent material of the kind conventionally used for film bases. On this base is applied, at least over the central portion of the photographically usable length of the film 4, an emulsion comprising a photosensitive coating, whereon a series of latent images illustrated by a series extending from a first frame 7 to a last frame 8 may be formed with a camera. The photosensitive coating is preferably of one of the forms, next to be described, which can subsequently be processed to form a projectable image on the film base. As indicated by the dotted lines, the film 1 is seen from the base side in FIG. 1, and the emulsion is on the opposite side.

Photosensitive coatings usable in the practice of the invention may be of any conventional variety adapted to be developed by a monobath processing composition to form a positive transparency suitable for projection. In particular, a currently preferred embodiment of the invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer reversal processes for the projection of black and white images, a silver halide developer and a silver halide solvent are applied in an aqueous alkaline solution to a photoexposed silver halide emulsion stratum, where they develop exposed silver halide to silver, and react with unreduced silver halide to form a soluble silver complex. This complex, in order to form a positive print, is transferred and reduced to silver on a silver-receptive stratum upon which the silver halide stratum has been superposed.

In one practice, in the completion of this process, the silver-receptive and silver halide strata have been separated in order to render the positive print visible. However, as indicated above, the positive print may be rendered visible without separation of the silver halide and the silver-receptive strata. For example, the silver-receptive stratum may be so constructed as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in superposition provide a composite print that presents a good image for projection purposes so long as they are contained on a transparent support. Since the silver halide and the silver-receptive stratum need not be separated, an overall simplification of the silver transfer reversal process is achieved.

A composite film assembly of this type, as well as processing compositions for producing a fully developed black and white image without the necessity of removing the developed negative image after processing, are shown in prior U.S. Pat. No. 2,861,885 to Edwin H. Land, which issued on Nov. 25, 1958, for Photographic Processes and Products. Other composite film assemblies capable of producing developed full color images without the necessity of removing the developed emulsion are shown in prior U.S. Pats. of Edwin H. Land, No. 2,726,154, issued Dec. 6, 1955, for Photographic Product, and No. 2,944,894, issued July 12, 1960, for Photographic Processes Utilizing Screen Members.

It should be noted that this invention is not directed to the chemistry by which images are developed in a photosensitive emulsion and transferred to an image receiving strata. However, in the practice of the invention, whether the film employed is black and white or color film, at the present time the preferred embodiment of the invention employs film of a type not requiring the removal of a negative emulsion after it is developed.

Referring again to FIG. 1, the film 1 is formed along one edge with sprocket holes such as 9 at regular intervals adapted to cooperate with a drive pawl, in a manner to be described, in either camera or projector, for incremental advancement of the film. The series of sprocket holes 9 adjacent the trailing end 5 of the film may be interrupted by a first elongated sprocket hole 10. This elongated hole 10 may span, for example, two of the sprocket holes 9.

Further along the film in the direction of the supply reel end, the series of speocket holes 9 is again interrupted by a second elongated sprocket hole 11, longer than the sprocket hole 10, and, for example, spanning three of the sprocket holes 9. The first elongated sprocket hole 10 establishes an exposure end point terminating advance of the film in the camera, whereas the second sprocket hole 11 determines a film takeup termination point in the film drive and projection apparatus to be described.

Cooperation of the sprocket holes 9 with the film drive pawl in a camera is conventional. As is well known in the art, following the exposure of each frame of the film, the drive pawl engages one of the sprocket holes 9, advances the film by one frame length, and is then cammed out of engagement with the film. After being driven through a return stroke, the pawl enters the next succeeding sprocket hole in preparation for the next film advance movement.

When the first elongated sprocket hole 10 is encountered, the camera's film drive pawl will fail to engage the film, and film advance will terminate. This event may be signaled to the operator, so that the exposed cassette may be replaced with a fresh one, by the somewhat different sound produced when the pawl repeatedly skips the film. In addition, a frame counter may be provided to produce a visible indication when the film has been exposed.

As will appear, it is preferred to advance the film beyond the exposure termination point established in the camera as just described, before applying processing composition to the exposed film. For that purpose, a double film drive pawl is employed in the film drive and projection apparatus. This double pawl comprises a pair of single pawls formed integrally and spaced to engage a pair of sequential sprocket holes 9 when driven in the same manner as the single pawl in the camera. Upon encountering the first elongated sprocket hole 10, one of the pawls forming the double pawl will engage the film, driving the film beyond the hole 10. However, upon encounering the second elongated sprocket hole 11, the double pawl will fail to engage the film, terminating film advance as in the camera, but at a point closer to the end of the film connected to the supply reel.

Formed on the trailing end 5 of the film 1, beyond the advance termination sprocket hole 11 just described in the direction of the supply reel end of the film 1, is a singularity generally designated 12 comprising a detent engaging element here shown as an aperture 13 formed in the film, adjacent which a projecting bump 14 is formed, as by pressure, heat and pressure, or the like. The singularity 14 thus comprises a hook adapted to engage a detent in the form of a process control actuating element, to be described, as the film is moved with respect to the detent engaging element in the direction of the takeup reel.

Formed on the leader end 2 of the film 1 is another detent engaging means, here shown as an aperture 15 in the central region of the film. This aperture serves to actuate a valve member forming a part of the processing apparatus to be described, for purposes to appear.

FIG. 2 shows, in part fragmentarily and in part schematically, the pertinent elements of an internally programmed cassette in accordance with the invention. The cassette comprises a housing generally designated 16, formed of any suitable opaque material such as metal, plastic, or the like, and preferably manufactured in two cooperating parts.

The housing parts comprise a base generally designated 17, comprising side walls 18 and a base plate shown at 19. The base plate 19 extends across the base of the walls 18, and comprises one side of the housing. The walls 18 extend at least in part about the periphery of the base plate 19, and cooperate with interfitted walls 20 of a cover generally designated 21 that overlaps the corresponding segments of the walls 18 to form sides enclosing the housing 16 of the cassette.

A cover plate 22 is formed integral with the walls 20, and completes the upper side of the housing as seen in FIG. 2. The terms "base," "cover," "upper," and "lower" are relative, and are adapted simply for convenience. Similarly, the selection of the parting lines between the walls 18 and 20 is a matter of convenience. In particular, the choice is preferably so made that the base 17 can serve as a support upon which all of the additional fixed and moving parts to be described may be assembled before the cover 21 is put in place.

When the cover is placed in position, it may be formed integral with the base 17 by heat sealing, or by a suitable adhesive, or the like. If of metal, the interfitting parts may be interlocked with cooperating detents formed therein, in a manner conventional and well known to those skilled in the art. Preferably, the base and cover parts comprise when assembled an end flange 23 that serves to support and locate the cassette in either a camera, or in the film drive and projection system to be described.

Figure 3:
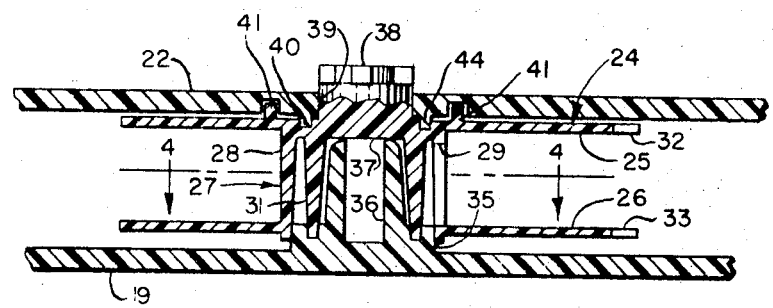
FIG. 3 is a fragmentary schematic cross sectional elevation, taken substantially along the lines 3—3 in FIG. 2, and showing a supply reel in conjunction with base and cover panels of the cassette of FIG. 2.
Figure 4:
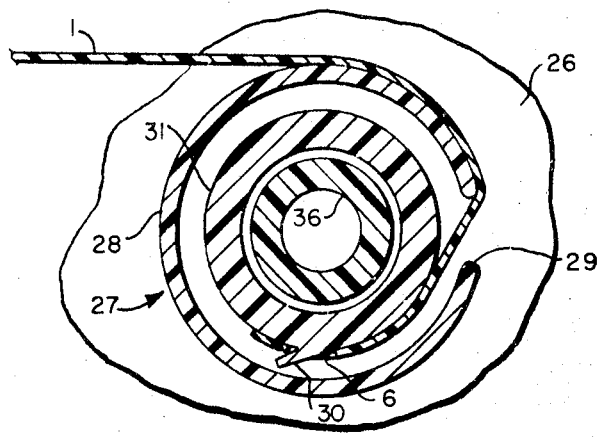
FIG. 4 is a cross sectional plan view of the apparatus of FIG. 3, taken substantially along the lines 4—4 in FIG. 3.

Rotatably disposed within the housing 16 is a supply reel generally designated 24. Referring to FIGS. 2-4, the reel 24 is provided with upper flange 25, and a corresponding lower flange 26, to guide the film strip 1 as it is wound about the spool portion 27 of the reel 24, to which the supply end of the film 1 (FIG. 1) is attached.

Referring to FIGS. 3 and 4, the spool 27 comprises an outer generally cylindrical member 28 provided with a slot 29 through which the trailing end of the film 1 extends. The end of the film is secured to a projection 30, protruding through the aperture 6, and formed integral with an inner cylindrical spool portion 31.

As best shown in FIG. 3, a bearing for the spool 24 is formed integral with the base plate 19, and comprises an annulus 35 extending upwardly between the spool portions 28 and 31. A tubular post 36, formed on the base plate 19, extends up through the central portion 31 of the spool into bearing engagement with a lower surface 37 formed on the flange 25.

As shown in FIGS. 2 and 3, four unidirectional teeth 32 are formed on the periphery of the upper flange 25 of the supply reel. Corresponding teeth 33 are formed on the lower flange 26, in registry with the teeth 32. These teeth are adapted to cooperate with an actuating arm, to be described, to effect the release of film processing composition in a manner to be described below.

A sprocket schematically indicated at 38 may be formed integral with the upper flange 25 of the reel 24 to adapt the reel to be driven about its axis of rotation. As shown, the sprocket 38 may protrude through a suitable recess 39 in the cover plate 22 (FIG. 3), light-baffled by suitable conventional annular flanges 40 and 41, formed on the cover plate 36 and on the upper surface of the flange 25, respectively, and extending into cooperating recesses, such as the recess 44 formed in the flange 25, in the opposed parts.

Referring again to FIG. 2, the film 1 is initially in its unexposed state and coiled primarily about the supply reel 24. It is shown in FIG. 2 in the position assumed as it nears the end of its movement away from the supply reel, as toward the end of exposure in a camera, in which it is nearly exhausted from the reel 24.

In its path from the supply reel 24, the film 1 first encounters a conventional bobulator roll 42. The film engages a portion of the periphery of the bobulator roll, as shown, and passes therefrom around a conventional idler roll 43 journalled for rotation in the housing, and thence through a film processing station, to be described below. In addition to the apparatus for processing the film 1 in a manner to be described, the film processing station comprises a signal generator generally designated S1 for producing an external condition signal on terminals schematically indicated at 45 and 46, to indicate whether or not the processing means has been actuated.

Beyond its path through the film processing station, the film 1 extends through a conventional light-baffled aperture schematically indicated at 47 and forming a portion of a film gate in the housing. The film 1 reenters the housing through a second light-baffled aperture generally designated 48 and comprising a second portion of the film gate. The film 1 next passes over a conventional snubber roll, generally designated 49, and finally passes to a takeup reel generally designated 50, comprising a spool portion to which the takeup reel end of the film is connected, and about which the film is wound as suggested in FIG. 2.

As shown in FIG. 2, in addition to parts corresponding to those described in connection with the supply reel 24, which may be identically duplicated for the takeup reel 50, the takeup reel comprises an external upper flange 52 protruding beyond the maximum radius of the film 1 when substantially stored on the takeup reel. On the flange 52 is formed a suitable drive sprocket 53, by means of which the film can be selectively advanced in a manner to be described.

The bobulator 42 may be of any conventional construction, and performs the known function of isolating the film drive pawl associated with a camera, or the double pawl discussed above that is associated with the film drive and projection system, from the inertia of the supply reel 24. For this purpose, the bobulator 42 comprises a roller 54 mounted in any conventional manner on a pivot that is in turn mounted on a support, not shown, movable with respect to the base plate 19 and biased by a spring, such that the bobulator roll 54 can both rotate, and be moved backwards and forwards in the directions of the double arrow shown in FIG. 2.

The bobulator roll thus responds to increases or decreases in the tension of the film 1 by temporarily shortening or lengthening the film path, respectively. Such changes in film tension are produced by the actuation of the film drive pawl and are determined by the inertial forces exerted by the supply reel 24, together with the larger or smaller supply of film that may be on it at any given time. By that arrangement, as the film is advanced incrementally by the pawl associated with the camera or projector, it can rapidly move the bobulator roll against its relatively light spring without immediately affecting the supply reel, which can then more or less gradually allow the bobulator roll to relax while supplying the segment of film taken by the pawl.

A lighttight shield around the film gate formed by the apertures 47 and 48 is formed by a wall portion 55, formed integral with the base plate 19 of the base 17, a pressure plate 56, to be described, and wall portions 57 and 58 formed integral with the base plate 19. These wall segments are formed integrally with the cover 21 after assembly of the parts in the manner described above. An exposed chamber behind the portion of the film 1 in the film gate is thus formed for the purpose of admitting projection light.

The apparatus for this purpose is conventional, and will only briefly be described. In short, it comprises a prism generally designated 59 and comprising a mirror, not shown, but disposed at 45° to the plane of FIG. 2. As schematically indicated, the prism 59 is mounted between extensions formed on a wall 60. The wall 60 is formed integral with the base plate 19.

Light enters the cassette, through an effective aperture schematically indicated at 62 and formed in the cover plate 22, in directions normal to the plane of FIG. 2. The mirror in the prism 59 directs this light downwardly through the film 1 in the film gate for the projection of images on the film through a suitable lens assembly, to be described.

Also disposed in the chamber bounded by the wall member 55 and the film passing through the film gate is a conventional pressure plate 56, located between the prism and the film, and biased by a spring 62 into engagement with the film. The spring 62 is supported and retained by suitably shaped extensions of the support wall 60, as shown.

The pressure plate serves in the conventional manner to cooperate with the camera, by locating the focal plane of the film during exposure. A conventional aperture is also provided in the pressure plate 62, as schematically indicated, to pass light entering through the prism assembly 59 through the film 1, after the film is processed in a manner to be described.

The snubber roll 49 may also be of entirely conventional construction. As illustrated, it is provided with a hub portion schematically indicated at 63 that is adapted to protrude through a suitable light-baffled aperture in the cover panel 22 for engagement by a stop member, comprising a part of either the camera or of the film drive and projection system, that is engaged when the film is to be incrementally advanced by a pawl for exposure or projection purposes. The cooperation between the snubber roll 49 and the takeup reel 50 is conventional, but will be briefly described.

The drive sprockets 38 and 53 of the supply and takeup reels 24, and 50, respectively, are adapted to be engaged by corresponding drive sprockets comprising a part of a camera, or of the film drive and projection apparatus to be described. In the film drive and projection apparatus, both supply and takeup reels are adapted to be driven through slip clutches. In the camera, only a drive for the takeup reel need be provided. This drive comprises a slip clutch connected to a sprocket driving the takeup reel drive sprocket 53, in cooperation with a drive pawl sequentially engaging a series of the sprockets 9 formed in the film 1, along a portion of the edge of the film in the film gate between the apertures 47 and 48.

When the snubber reel 49 is stopped by engagement of the hub 63 as described above, operation of either the camera or of the film drive and projection apparatus to incrementally advance the film towards the takeup reel, by engagement of a pawl with the sprocket holes in the film 1, will momentarily loosen the film from engagement with the stationary snubber roll 49 and allow the slip clutch driving the takeup reel 50 to take up that increment of the film advanced by the pawl. Between engagements of the pawl, the slip clutch prevents the takeup reel from advancing the film.

In the film drive and projection apparatus to be described, the snubber reel 49 is engaged only while the film is to be incrementally advanced onto the takeup reel. When the film is rewound onto the supply reel, the snubber reel 49 is disengaged and acts as an idler. As will appear, that may occur either during the processing of the film while rewinding, or during subsequent rewinding of the processed film after projection.

The film processing station, fragmentarily shown in FIG. 2, will next be described, in its presently preferred embodiment, with reference first to FIG. 2. As there shown, the apparatus generally comprises wall means comprising portions of, or formed integral with, the base 17 and the cover 21 which serve to guide, support and house the various elements of the processing apparatus to be described. Generally speaking, these comprise an outer film composition containing housing generally designated 64 and forming a chamber in which there is mounted an initially sealed container of processing composition 65. The container 64 communicates with a coating nozzle generally designated 66. These elements are mounted above the plane of the film 1.

More specifically, the outer container 64 comprises walls 67 formed integral with the floor plate 19 and extending upwardly therefrom in FIG. 2. The walls 67 and floor plate 19 form a container open on a side that is closed by a cover panel fragmentarily shown at 68 of the same general configuration as the region bounded by the walls 67 of the container 64.

The panel 68 is preferably put in place prior to assembly of the cover 21 with the base 17, and serves as a support for the top plate 22 after final assembly. As schematically indicated, the walls 67 are formed with an upper lug 69, and a lower ledge portion 70, in each of which are formed locating recesses 71 and 72, respectively, (FIG. 24) adapted to receive corresponding locating posts, not shown, formed on the inside of the cover panel 68 to aid in locating the panel 68 during its installation as the cover of the container 64.

The initially sealed container for the processing composition 65, mounted within the outer container 64, comprises a tub-like receptacle 73, of a suitable plastic or the like, selected to resist interaction with the processing composition, or permeation thereof by ambient gases. The receptacle 73 initially contains a charge 65 of processing composition in an adequate amount to process the film 1.

The receptacle 73 is formed on an open side with a circumscribing flange 74 adapted to fit into corresponding cooperating recesses formed in the floor plate 19 and a mating pair of cooperating recesses formed in the cover panel 22, not shown. As shown in FIG. 2, the flange 74 rests against a shoulder formed on the lug 69 at the upper end of the wall 67, and on an inner corner of the ledge 70 formed at the lower end of the wall 67.

The receptacle 73 is sealed to initially contain the processing composition 65 by one end 75 of a tear-tab generally designated 76. The tear-tab 76 may be made of any suitable form of plastic, or the like, material, selected to resist the action of the composition 65 and to avoid interaction therewith, as well as to prevent the diffusion into the composition 65 of gases such as oxygen, carbon dioxide, carbon monoxide, water, oxides or hydrides of sulfur or nitrogen, or the like, that might modify its composition. The end 75 is sealed to the plane surface of the flange 74 surrounding the opening formed on the receptacle 73, and within the flange area extending into the mounting recesses described agbove, by any suitable means such as heat sealing, a suitable adhesive, or the like.

The tear-tab 76 extends, from the end 75 sealed to the receptacle 73, back upon itself, out through an aperture 77 formed in the walls 67. From the aperture 77, the tear-tab passes over an idler 78, journalled in the housing, to an actuating assembly, next to be described below.

Comparing FIGS. 2 and 5, the supply reel 24 in part overlies a well 81 formed as a recess in the base plate 19 and disposed about the inner flange 35 forming a part of the bearing assembly for the supply reel as described above. In this well is disposed an actuating arm generally designated 82 having a curved central portion 83 that extends around the flange 35 with clearance, to a first outstanding arm 84 terminating in an upstanding flange 85. As shown in FIGS. 5–8, the flange 85 is bent over to form a ledge 86 adapted to engage one of the teeth 32 on the flange 25 of the supply spool 24 in a manner and for purposes to be described. An extension 87 of the ledge 86 is formed with an upstanding tab 88 that is bent over as shown in FIG. 8 to form a cam engaging surface for purposes to be described. The extension 87 is bent over to form portions 89 and 90 that comprise a hook adapted to engage an upstanding post 91 formed integral with the floor plate 19 to hold the arm 82 in an initial position, to be described. As best shown in FIGS. 8, 16a and 16b, portions 87 and 89 of the hook are formed with a slot 92 through which the post 91 can at times escape.

The other end of the arm 82 is formed with an extension 93, terminating in an upstanding portion 94 bent to form a horizontally-extending flange 95 that is bent again to form a downwardly extending hook 96. As best shown in FIG. 10, the hook 96 terminates at its lower end in a projection 97. Referring now to FIGS. 5 and 20, the tear-tab 76 is formed at its end with a loop 98 made by folding the tear-tab back upon itself and sealing it to itself by heat sealing, or by a suitable adhesive or the like. This loop 98 is passed around the hook 96 and rests on the projection 97 as shown in FIG. 20. The loop 98 is held in the position as shown in FIG. 5 by a spring arm 99 formed as an extension on an upstanding arm 100 that is formed integral with a base plate 101 as best shown in FIGS. 5, 17 and 18.

The base plate 101 is secured by means suggested at 102 to the base plate 19. At its other end, the base plate 101 is formed with an upstanding arm 103 that is formed integral with an extending spring arm 104. The base plate 101, its spring arm extensions 99 and 104, and their interconnecting parts, are preferably formed from a single strip or sheet of spring metal or the like.

In the initial position of the parts shown in FIG. 5, the loop 98 formed on the tear-tab 76 is held against the hook 96 by the spring arm 99. The spring 99 in turn urges the arm 82 downwardly and to the right in FIG. 5, causing the end 89 of the arm 82 to engage the post 91 and fix the arm 82 in an initial inactive position in which it is out of the way of the teeth 32 formed on the flange 35 of the supply reel 24.

Figure 13:
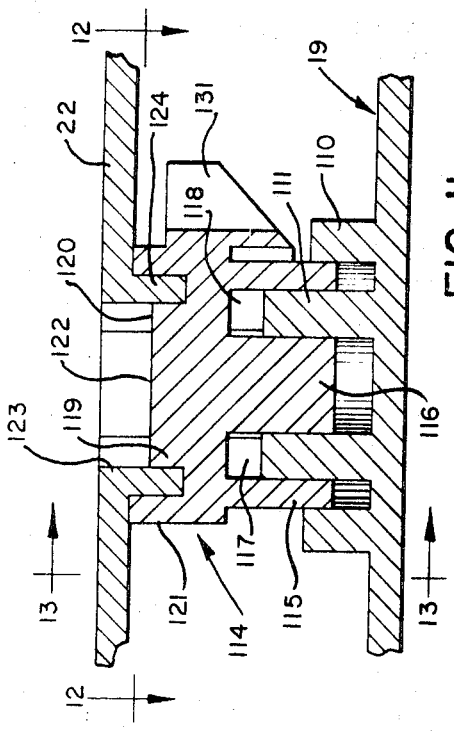
FIG. 13 is an elevational view of the apparatus of FIG. 11, taken substantially along the lines 13—13 in FIG. 11, with parts broken away.

Referring now to FIGS. 2 and 11–14, the base plate 19 of the cassette is formed with a pair of concentric upstanding flanges 110 and 111. Beyond the outer flange 110 and formed integral with the floor plate 19 is an upstanding post 113, as best shown in FIGS. 2 and 13.

The flanges 110 and 111 serve to provide a guide and bearing for a cam block generally designated 114 and best shown in FIGS. 11–14. The cam block 114 is provided with a lower outer cylindrical flange portion 115 that is received at its lower end between the flanges 110 and 111. A central post 116 formed on the cam block 114 is joined to the outer flange 115 by webs 117 and 118. The webs 117 and 118 extend upwardly to a pair of lugs 119 and 120, respectively, formed on the center post 116.

Figure 11:
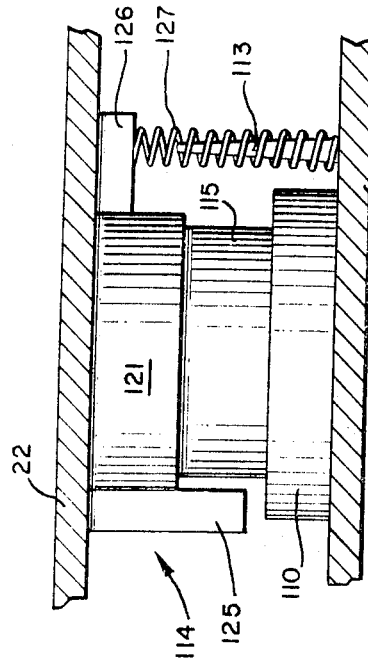
FIG. 11 is a fragmentary schematic cross sectional elevational view of a portion of the cassette of FIG. 2, showing in addition a cam and a fragment of a cover panel forming a portion of the apparatus of FIG. 2.

Surrounding the lugs 119 and 120 and extending upwardly therefrom is an upper annular flange 121. The upper surface 122 of the center post 116 is exposed through a circular recess 123 formed in the cover plate 22, as shown in FIG. 11. A downwardly projecting cylindrical flange 124 formed about the periphery of the port 123 extends between the flange 121 formed on the cam block 114 and the lugs 119 and 120.

The flange 121 cooperates with the flange 124 to provide a light-baffled entrance to the cassette through which access to the cam block 114 may be had. The lugs 119 and 120 serve to guide the cam block 114 in the recess 123.

As best shown in FIGS. 12 and 13, a pair of lugs 125 and 126 are formed on the outer flange 121 of the cam block 114. The lug 125 serves as a stop to limit downward movement of the cam block 114 by engagement with the flange 110. The lug 126 serves as a stop for a spring 127 mounted on the post 113 and normally in compression to urge the cam block 114 up against the cover plate 22.

It will be apparent that by the construction just described, the cam block 114 is normally urged into engagement with the cover plate 22, but can be forced downwardly by the exertion of a force on the upper surface 122 of the center post 116 through the aperture 123. Such a force is adapted to be exerted by a locating pin 128, forming a part of the film drive and projection apparatus, to be described, and shown schematically in FIG. 115 as urged away from a support 130 by means of a spring 129.

Figure 14:
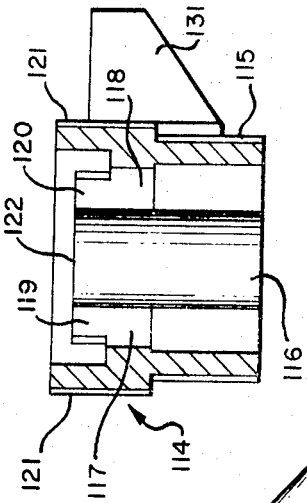
FIG. 14 is a cross sectional elevational view of the apparatus of FIG. 12, taken substantially along the lines 14—14 in FIG. 12.

As will appear, when a cassette in accordance with our invention is inserted into the housing of the film drive and projection apparatus, the locating pin 128 is adapted to enter the recess 123 and drive the cam block 114 downwardly as seen in FIG. 11. That will cause downward movement of a cam 131 formed as an extension on the cam block 114 as shown in FIGS. 11 and 14.

Referring now to FIG. 16a, the lower surface 132 of the cam 131 is adapted to engage the tab 88 on the arm 82 when the arm is in engagement with the post 91 as shown in FIG. 16a. In the initial position shown in FIG. 16a, the arm 82 is retained on the post 91, and the cam 131 lightly engages the tab 88.

When the locating post 128 enters the recess 123 in the cover 22, the cam 114 is urged downwardly in FIG. 16a, and the arm 82 is displaced to the left in FIG. 16a, to the position shown in FIG. 16b, in which the post 91 moves out through the slot 92. That frees the arm 82 to move downwardly and to the right in FIG. 5 under the influence of the spring 99, to bring the ledge 86 in position to be engaged by one of the teeth 32 formed on the flange 25 of the supply reel 24.

The operation of the tear-tab release mechanism just described will next be discussed in connection with FIGS. 2, 5, 16a, 16b, 21, 22 and 23. Referring first to FIGS. 2 and 5, in the initial position of the apparatus, the tear-tab 76 is initially sealed over the surface of the flange 74 formed on the receptacle 73 to contain the processing composition 65. The arm 82 is in engagement with the post 91, so that the ledge 86 is out of the way of the teeth 32 formed on the supply reel 24, allowing the supply reel to rotate in either direction without actuation of the arm 82. That position of the parts prevails during exposure of the film in the camera, while the film is transferred from the supply reel to the takeup reel, and is maintained when the cassette is removed from the camera. When the cassette is placed in the film drive and projection apparatus, to be discussed below, the locating pin 128, shown in FIGS. 15 and 16a, will enter the recess 123 in the cover plate 22 and force the cam 131 downwardly, knocking the arm 82 out of engagement with the post 91 and moving it to the position shown in FIG. 16b.

Referring next to FIGS. 2 and 21, with the arm 82 out of engagement with the post 91, the film may be advanced further onto the takeup reel, with the supply reel 24 rotating clockwise in FIGS. 2 and 21, without any substantial movement of the arm 82. That is because the rims of the flanges such as 25 rise gradually to the teeth 32 along the flange, and the teeth 32 pass the ledge 86 without engagement.

However, when the film is returned to the supply reel, with concomitant rotation of the supply reel 24 clockwise in FIGS. 2 and 21, one of the teeth 32 will engage the ledge 86, and rotate the arm 83 clockwise as seen in FIG. 21. That will carry the end of the tear-tab 76 on which the loop 98 is formed downwardly and to the left in FIGS. 21 and 22, with the tear-tab being bent about the end of the spring 99, as shown in FIG. 22. During this rotation of the arm 82, the end 89 will pass alongside an upstanding ledge 133 formed integral with the floor plate 19. The tear-tab 76 will now become at least partially detached from the receptacle 73, allowing the processing composition 65 to flow out into the outer container 64.

As the arm 82 continues to rotate, the hook 96 and the loop 98 formed on the tear-tab 76 will engage the spring 104, driving the arm 82 upwardly and to the right, as shown in FIG. 23, off the ledge 133 and into a recess 134 formed adjacent the ledge 133, in which position the arm will be held by the spring 104. The arm 82 is now out of engagement with the flange 25, which can thereafter be rotated in either direction without further interaction with the arm 82.

Other elements of the processing apparatus will next be described with reference to FIGS. 2 and 24–52. Reference will first be made to FIGS. 2 and 24. As there shown, outside of the container comprising the receptacle 73, and initially sealed by the tear-tab 76, the walls 67 of the outer container 64 define a chamber 79 into which the processing composition 65 can flow when the tear-tab 76 is partially detached from the receptacle 73 in the manner described above. The outer chamber 79 communicates with the coating nozzle 66 by way of a downwardly converging section 80 that communicates with a downwardly converging nozzle inlet passage 135 formed in the nozzle 65.

Referring now to FIGS. 24 and 42–46, the coating nozzle 66 may be formed in a conventional manner, as by precision molding or the like, from a suitable thermoplastic resin selected to form a dimensionally stable and accurate molding whose working surfaces can be kept to close tolerances. The most critical of these form a plane, generally U-shaped film engaging land 136 on the base of the nozzle, as best shown in FIG. 42, and a doctor bar 137, lying across the bend of the U-shaped land 136, and recessed beneath it as best shown in FIGS. 43 and 44. The depth to which the doctor bar is recessed is greatly exaggerated in the drawings; it is selected to be twice the desired thickness to which the coating composition is applied to the film 1. The land 136 and doctor bar 137 circumscribe a generally rectangular outlet aperture 138 formed in the nozzle and communicating with the downwardly converging passageway 135 through which the processing composition is received from the outer container 64, described above.

The nozzle 66 is preferably formed in the generally asymmetric shape shown, both to facilitate correct orientation of the nozzle during assembly, and to lock the nozzle in place after assembly. For that purpose, the nozzle is formed with locking recesses 139 and 140 at the sides, as shown in FIGS. 42 and 45; with a sloping end 141, as shown in FIGS. 42 and 46; and, in the sloping end, with a locking recess 142, tapered as shown in FIG. 44, to further confine the nozzle in place. As best shown in FIGS. 43 and 45, the ends 143 and 144 are tapered downwardly to serve the same purpose.

Referring to FIG. 24, these ends 143 and 144 engage corresponding notches 145 and 146 formed in an extension 147 of the wall 67, and in the ledge 70, respectively, to receive the nozzle 66. The nozzle 66 is confined at its base by a wall 148 formed integral with the base plate 19. The sides 153 and 154 of the nozzle 66 are retained by the base plate 19 and cover plate 22 of the housing.

The nozzle 66 is provided at the sides with posts 155 and 156 that provide guidance for the film 1 over the coating gap. These posts also serve at times to stop the nozzle closure plate portion of a cam and valve assembly 157, to be described. Referring now to FIG. 42, when engaged with the film in the manner to be described below, the film is adapted to pass over the nozzle outlet port 138 and between the posts 155 and 156, with the emulsion side of the film in engagement with the land 136. During this engagement, coating takes place while the film moves, so that the emulsion surface leaves the coating aperture 138 as it passes over the doctor bar 137 and carries with it a coating of processing composition established by the depth to which the bar 137 is recessed below the land 136.

Referring again to FIG. 24, and also to FIGS. 37–41, a pressure pad asembly 158 will next be described. The pressure pad 158 is shown in FIG. 24 in the initial position assumed upon assembly of the cassette and prior to processing of the film 1.

As shown in FIG. 24, the film 1 normally passes below the nozzle 66, and above a normally disengaged film engaging pad surface 159. The pad surface is formed on an upwardly extending and generally rectangular protrusion in a base plate 160, as best shown in FIGS. 37 and 38. The pressure pad assembly 158 may be made of any suitable conventional material, such as stainless steel or the like.

The raised surface 159, formed by diestamping or the like, is ground or otherwise finished with a film engaging plane 161, of generally U-shaped configuration as illustrated in FIG. 37, that is adapted to mate, through the film 1, with the plane of the land 136 of the nozzle (FIGS. 24 and 42) and generally conform to the working area of the nozzle 66 confined between the land 136 and the doctor bar 137 and encompassing the rectangular opening 138 through which the fluid composition passes.

As shown in FIGS. 24, 37 and 38, the pressure pad assembly 158 is formed with an end 162 that is adapted to lightly engage the base side of the film 1 in the initial position shown in FIG. 24, for purposes to appear. Formed adjacent the end 162 on the plate 160, and extending outwardly therefrom, are a pair of ears 163 and 164 adapted to extend up past the film 1 on either side and to initially engage the underside of the nozzle 66 in the recesses 139 and 140 (FIGS. 42 and 45).

The pressure pad 158 is formed at its other end with a shroud generally designated 165 comprising a side wall 166 formed integral with the plate 160 and extending upwardly past the film in FIG. 24 to an upper plate 167 that passes over the film 1 and engages a sloping ledge 168 formed in the lower side of an extension 169 of the walls 67 and 147. The extension 169 is formed integral with the base plate 19 and joins the wall 55 confining the exposure and projection station.

Referring again to FIGS. 37–41, as well as to FIG. 24, the top plate 167 continues over to a second side wall portion 170 that extends toward the base plate 160, but terminates short thereof at an end 171. The end 171 of the wall portion 170 confronts a wall portion 172 extending upwardly from the base plate 160 and separated from the end 171 to form a slot through which the film 1 can initially be threaded in assembling the apparatus. As will appear, the side walls 166, 170 and 172 of the shroud 165 will serve at times as guides for the combined pressure pad depressing cam and nozzle closure plate assembly 157, to be described.

The base plate 160 of the pressure pad is divided into legs 173 and 174, which are bent downwardly somewhat in the region of the shroud 165 as indicated in FIG. 38. Between the legs 173 and 174 is formed a downwardly depending hook element 175 that initially serves as a detent to hold the pressure pad 158 in an inactive position in the housing. For that purpose, as best shown in FIG. 24, the hook 175 is engaged in the initial position shown by an upwardly bent end 176 formed at the end of a spring 177.

The spring 177, shown in part in FIG. 2 and in part in FIG. 24, is best shown in FIGS. 50 and 51. As there shown, the spring 177 comprises a base portion 178 that is cut out as indicated at 179 to clear the idler 43 as shown in FIG. 2. Referring again to FIGS. 50 and 51, the base portion 178 is further provided with a pair of mounting apertures 180 in which suitable fasteners, shown as a pair of screws 181 in FIG. 2, can pass for securing the base 178 to the base plate 19. In practice, the base 178 of the spring 177 may be secured by heat staking it to the thermoplastic material of the base plate 19, as by heating and melting a portion of the base plate 19 through the apertures 180. Alternatively, the spring may be secured by rivets, or other fasteners or the like could be employed.

From the base portion 178, a resilient spring arm 182 extends, in planes normal to the base, into engagement with the film engaging portion of the pressure pad 158, and thence to its termination 176 initially engaged with the hook 175. Intermediate the ends of the arm 182 is formed a pressure pad engaging button 183 that serves to engage the lower surface of the raised portion 159 of the pressure pad 158 and urge it toward engagement with the film 1.

Referring again to FIGS. 24, 37 and 38, the pressure pad 158 is formed at either side of the hook 175 with a pair of upstanding ears 184. The ears 184 serve as further guides for the pressure pad depressing cam and nozzle closure plate assembly 157.

Referring now to FIG. 24 in conjunction with FIGS. 34-36, the pressure pad depressing cam and nozzle closure plate assembly 157 will next be described. Referring first to FIGS. 34-36, the assembly 157 comprises a plane base plate 185 formed at one end 186 with tapering sides 187 to guide entry of the end 186 into a position covering the outlet port 138 in the nozzle 66, in a manner to appear, to close the nozzle at the end of the processing operation. In that position, a pair of shoulders 188 on the plate 185 cooperate with the stops 155 and 156 on the nozzle 66, as suggested in FIG. 33, to stop the nozzle in its final position.

Formed as orthogonal extensions on the side of the base plate 185 are a pair of cams 189 and 190 that serve at times to depress the pressure pad, described above, in a manner to appear below. The cam 189 is shorter than the cam 188, to cooperate with the slot formed in the shroud 165 of the pressure pad, described above, to facilitate threading of the film 1 during assembly of the cassette.

Toward the left end of the plate 185, as best shown in FIGS. 33 and 34, the cam 188 is formed with a normally extending arm 191 that extends generally parallel to the plate 185 and is formed with a pair of spring arm extensions 192 and 193. As best shown in FIG. 34, these arm extensions taper away from each other towards the ends, to allow entry of a film aperture in a manner to appear.

A central portion 194 is bent upwardly and away from leg extension portions 195 and 196 of the base plate 185, as best shown in FIG. 34, to form a hook having as its upper portion the extension 194 and as its lower portions the arms 195 and 196. Referring again to FIG. 24, these hook elements initially engage a ledge portion 197 formed integral with the base plate 19 to hold the assembly 157 in the position shown. In that position, the cams 189 and 190 extend into and are guided by the walls of the shroud 165, and the nozzle closing plate end 186 of the assembly 157 confronts but does not engage a downwardly sloping guide ledge 198 formed on the wall extension 147 referred to above.

The upper spring arm 193, of the hook comprising that arm and the lower arm 192 formed on the assembly 69, lightly engages the base of the film 1 in the initial position of the parts shown in FIG. 24. The upwardly bent end of the arm 193 thus serves as a unidirectional detent that is adapted to engage an aperture in the film, in a manner to be described below, towards the end of the processing cycle to be described.

The cam portion 190 of the assembly 157, of metallic conducting material, cooperates with a pair of contact 199 and 200 formed integrally with contacts adapted to engage the terminals 45 and 46, as shown in FIG. 24, to form a signal generator indicating whether or not the film 1 has been processed. For this purpose, in the initial position of the parts shown in FIG. 24 assumed before the processing cycle is started, the cam 190 engages both contacts 199 and 200 and thus bridges them to supply an external signal to the terminals 45 and 46, which indicate by their bridged condition that the film is not processed. As will appear, at the end of the processing cycle, the assembly 157 will be carried to the right in FIG. 24, opening the contacts 199 and 200 to cause an open circuit to be presented to the terminals 45 and 46, indicating that the film has been processed.

Referring now to FIGS. 2 and 24, a pocket 201 is formed in the walls 67 of the outer container 64, adjacent the aperture 77 in the container 64 through which the tear-tab 76 extends. A pad 202 of sponge-like material, wettable and swellable by the processing composition 65, is located in the pocket 201 in position to engage the tear-tab 76 as it is in part withdrawn from the container 64 in response to actuation of the tear-tab release mechanism described above.

The pad 202 may be of natural or synthetic sponge, or of matted wood, rag or paper fibers or the like. When the tear-tab 76 is withdrawn, its wetted surface, or any processing composition attempting to flow past the tear-tab through the aperture 77, will wet the pad 202, causing it to expand and seal the aperture 77 against the escape of processing composition.

Having described one embodiment of the cassette of the invention, its operation will next be described in connection with FIGS. 2 and 24-32.

Figure 15:
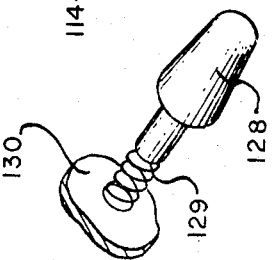
FIG. 15 is a schematic perspective sketch of a cam actuating pin adapted to cooperate with the apparatus of FIGS. 11–14.

Referring to FIG. 2, it will be assumed that an initially unexposed strip of film 1 stored primarily on the supply reel 24 has been exposed in a camera, so that it has been advanced onto the takeup reel 50 to the exposure termination point determined by the first elongated sprocket hole 10 on the film (FIG. 1). Next, assume that the cassette is removed from the camera. An instrument, such as the detent 128 in FIG. 15, is then inserted through the aperture 123 in the cover plate 22 to drive the cam 131 downwardly, from the position shown in FIG. 16a to the position shown in FIG. 16b. That will move the arm 82 out of engagement with the post 91, and bring the ledge 86 on the arm 82 into operative relationship with the teeth 32 on the supply reel 24, as shown in FIG. 21.

Next, assume that operation has continued by further rotation of the takeup reel 50 counterclockwise as seen in FIG. 2 to bring the film 1 farther onto the takeup reel. That will cause counterclockwise rotation of the supply reel 24, as seen in FIG. 2. Rotation in that direction will not cause the tear-tab to be detached from the receptacle 73, because the teeth 32 are ineffective to engage the ledge 86.

FIG. 24 shows the parts of the processing apparatus in their initial position, which is maintained during exposure of the film and during the first increment of motion just described from the exposure termination point to the second termination point in which the film is substantially exhausted from the supply reel. In that position, the cam and nozzle closure plate assembly 157 is held in place by engagement of the arms 194 and 195 with the ledge 197, and the upper resilient arm 193 of the film engaging hook formed on the assembly 157 is lightly engaging the base of the film 1.

The pressure pad 158 is initially held in place by by engagement of its hook 175 with the detent 176 formed on the spring 177. In that position, the end 162 of the pressure pad 158 is lightly engaging the base of the film 1, and the shroud 165 is in engagement with the ledge 168 formed on the wall segment 169.

The parts will remain in the position shown in FIG. 24 until, during the further advance of the film 1 towards the takeup reel, the film engaging hook 12 approaches and engages the end 162 formed on the pressure pad 158, as shown in FIG. 25. When that occurs, near the second termination point established by the second elongated hole 11 in the film (FIG. 1), the hook 12 will move the pressure pad to the left in FIG. 25, to the position shown in FIG. 26. In that position, the shroud 165 has moved out of engagement with the ledge 168, and upwardly under the influence of the spring 177. The ears 163 and 164 on the pressure pad 158 will come into engagement with the posts 156 and 155, respectively, forming a part of the nozzle 66, and the pressure pad 158 will swing up into engagement with the film 1 and carry the emulsion side of the film into coating engagement with the nozzle 66.

As the pressure pad 158 is moved to the left, the detent 176 formed on the spring 177 will be disengaged by the hook 175. The purpose of the detent 176 is primarily to prevent premature movement of the pressure pad 158 in the housing prior to its positive disengagement from the intitial position shown in FIG. 24 by the hook 12.

Next, assume that the first rewind operation is begun, by rotating the supply reel 24 clockwise in FIG. 2, thereby enabling the first of the teeth 32 encountering the ledge 86 on the arm 82 to engage the ledge 86 and rotate the arm clockwise (as seen in FIG. 21). Referring to FIG. 27, as this motion of the supply reel is begun, it will bring the hook 12 out of engagement with the end 162 of the pressure pad 158, as shown.

Referring next to FIGS. 22, 23 and 24, as the supply reel 24 is rotated, the arm 82 of the tear-tab actuating assembly will be carried clockwise, detaching the tear-tab 76 in part from the receptacle 73 to allow the composition 65 to flow down into coating engagement with the nozzle and the film 1. The composition will then be uniformly coated on the emulsion side of the film 1 to a thickness determined by the doctor bar 137.

A doctor bar coater is preferred to other conventional forms of coaters for the purpose of coating the film, because it is inherently insensitive to changes in the viscosity of the processing composition, and to changes in linear film speed with respect to the doctor bar, over a reasonable range that makes the process relatively insensitive to these variables. In particular, as is well known in the art in other contexts, as doctor blade or doctor bar coater inherently will lay down a uniform coating of one-half the distance between the doctor bar and the coated substrate under conditions in which a uniform meniscus can be formed on the coating liquid adjacent its interface with the substrate.

Figure 28:
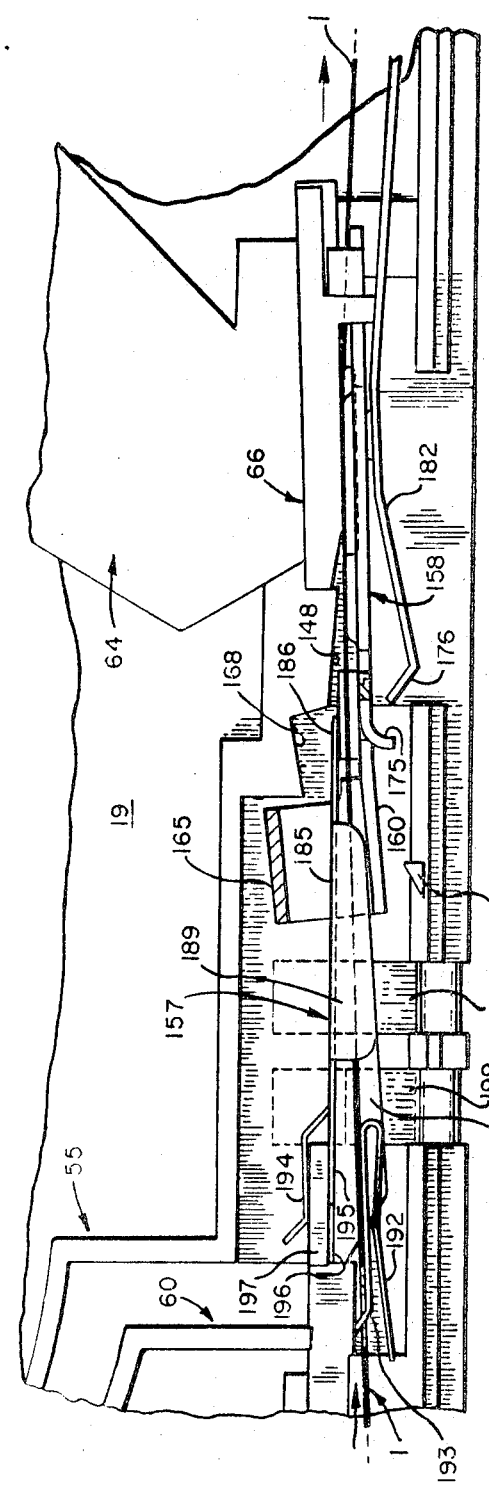

The coating operation begun with the parts in the position shown in FIGS. 23 and 27 will continue until the composition 65 is substantially exhausted and the film is stored substantially all on the supply reel 24. Toward the end of that operation, the aperture 15 (FIG. 1) will approach and engage the hook finger 193 formed on the valve and cam assembly 69 as shown in FIG. 28.

Figure 29:
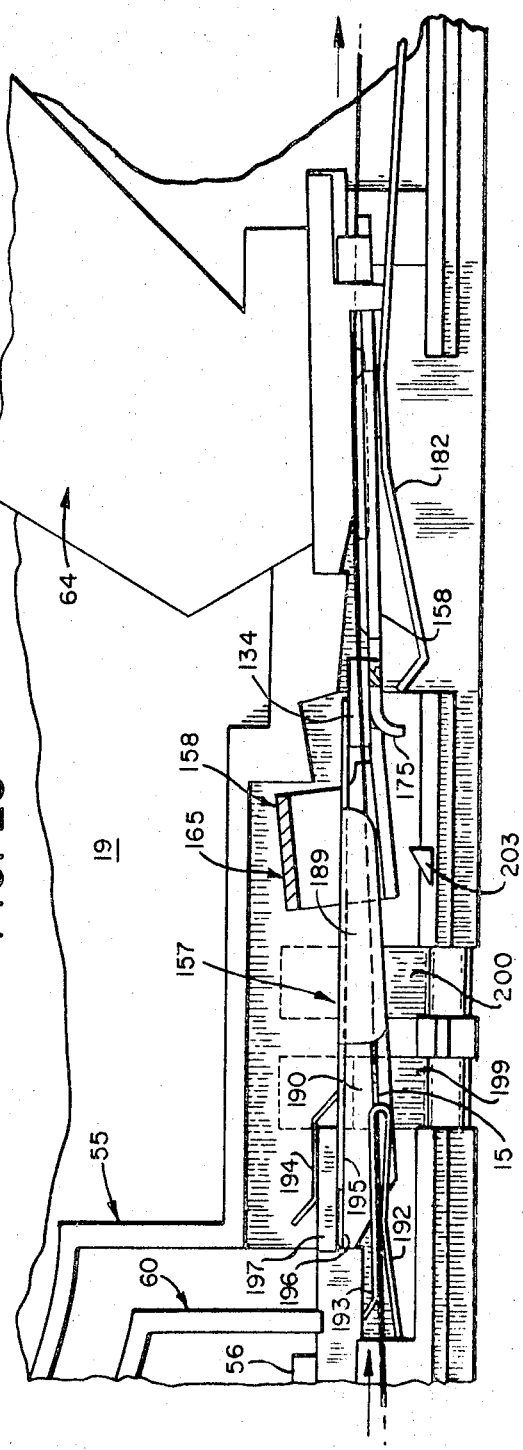

As the film 1 continues to move onto the supply reel, engagement of the aperture 15 in the film with the spring arm 193 will carry the film along the arm and downwardly, as suggested in FIG. 29, into the bight formed between the arms 192 and 193. Further movement of the film 1 towards the supply reel will carry the cam and valve member 157 to the right of the position shown in FIG. 29, causing the spring arms 194, 195 and 196 to disengage the ledge 197, and bringing the cams 189 and 190 into contact with the base plate 160 of the pressure pad 158 in the region of the shroud 165, as the assembly 157 moves to the position shown in FIG. 30.

During this movement, the end 186 of the cam and valve assembly 157 is guided by the cam 198 formed on the wall extension 147 of the housing, and moves below the nozzle 66 towards a nozzle closing position. The pressure pad 158 begins to move downwardly, out of engagement with the film 1. The film is still held down out of its normal plane of movement by engagement with the bight formed between the spring arms 192 and 193, as shown in FIG. 30.

Movement in this direction will continue to move the assembly 157 to the right in FIG. 30, as it goes to the position shown in FIG. 31 in which the end 186 of the valve assembly 157 closes the nozzle 66 and the shoulders 188 (FIG. 33) formed on the assembly 66 engage the stops 155 and 156 formed on the nozzle 66. The lower spring arm 192 glides over and engages a stop 203, which may conveniently be formed on the cover wall portion 20, to latch the cam assembly 157 against movement to the left as shown in FIG. 31.

During its movement from the position shown in FIG. 29 to the position shown in FIG. 30, the cam 190 disengages the contact 199, and thus provides a signal indicating that the film has been processed. Further movement to the position shown in FIG. 31 will completely disengage the contacts 199 and 200.

Figure 32:
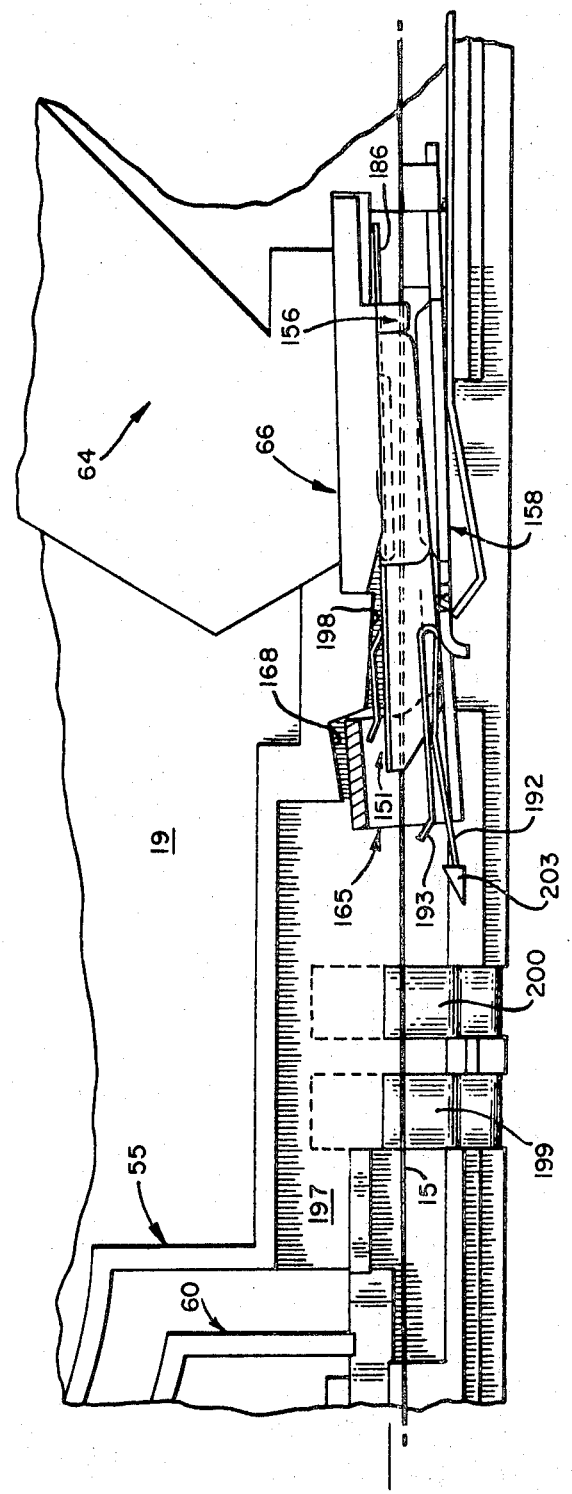

FIG. 31 shows the final disengaged position of the processor parts, with the film 1 still engaged with the bight formed between the hook elements 192 and 193. The next significant relative movement of the parts will not occur until the film is again moved toward the takeup reel, as during projection of the processed film. When that occurs, as illustrated in FIG. 32, the aperture 15 will disengage the arm 193, and the film will rise to its initial plane of movement, in which it is free of all of the elements of the processing apparatus, for subsequent cycles of projection and rewinding.

The nozzle 66 is now closed except for the small passage between the doctor bar and the upper surface of the valve end 186 of the assembly 157. Since this is quite a small aperture, on the order of several ten-thousandths of an inch, it will quickly be sealed by the evaporation of the vehicle from the processing composition, with concomitant drying and hardening of the composition in the gap. Contamination of the apparatus is further prevented by the fact that any leakage of processing composition that may occur will be primarily upon the upper surface of the end 186 of the assembly 157, where it will be exposed to drying without further contact with the film. As noted above, any tendance of the processing composition to escape through the aperture 77 in the outer container 69 is prevented by wetting of the sponge 202, which will swell and seal the aperture.

Referring next to FIG. 53, we have shown the basic elements of a film drive and projection system suitable for use with a cassette 16 of the form just described. In this system, the processing operations described above, together with projection and rewinding operations, can be automatically carried out so that exposed film in the cassette may be rapidly processed and projected by the user immediately after it is exposed in the camera.

Because the details of the film drive and projection system form no part of this invention, the system will be described in an elementary form adequate to illustrate the operations carried out in the use of the cassette of the invention, without reference to many features that could be provided. In particular, automatic operation of the system under the direction of the signal provided on the terminals 45 and 46 of the cassette is beyond the scope of this invention, and will not be discussed here.

As shown in FIG. 53, a film drive and projection system suitable for use with the invention may comprise an outer housing schematically indicated at 204 of opaque material, pierced by a projection aperture defined by the barrel schematically indicated at 205 of a lens assembly comprising a lens 206. The system is adapted to be supplied with electrical energy from any convenient source, here schematically shown as a source of direct current having a potential E that is positive with respect to a reference ground.

As suggested in FIG. 53, the housing 204 is provided with a receptacle adapted to receive a cassette 16 and comprising suitable ledge members schematically indicated at 207 for engagement with the sides of the cassette and with the flange 23 formed on the cassette. As will be appreciated by those skilled in the art, these ledge members guide and stop the cassette to locate it in a predetermined position in the housing for interconnection and cooperation with elements of the film drive and projection system, to be described.

As suggested in FIG. 53, the cam block engaging locating pin 128 is urged into the recess 123 in the cover plate 22 when the cassette 16 is inserted into the housing 204. That will actuate the cam 131 for the purposes described above.

When a cassette 16 is inserted in the housing 204, its supply reel drive sprocket 38 is engaged with a drive sprocket 208 driven by a shaft schematically indicated by the dotted line 209. The shaft 209 is connected to one side of a conventional slip clutch schematically shown at 210.

The slip clutch 210 has an input shaft schematically indicated at 211 and comprising the output shaft of a conventional DC motor SM. When energized in a manner to be described, the motor SM drives the supply reel sprocket 38 through the slip clutch 210, with consequent rotation of the shaft 209.

As schematically indicated at 212, the shaft 209 is connected to a motion detector IM, schematically shown as a visible indicator needle which, by its movement, indicates motion of the shaft 209 in either direction. This visible signal may be produced upon rotation of the drive shaft 209 in one direction in response to energization of the motor SM. It may also be produced upon rotation of the shaft in the opposite direction in response to drive of the takeup reel sprocket 53, with concomitant rotation of the supply reel drive sprocket 38, as the film is taken from the supply reel.

The takeup reel drive sprocket 53 engages a drive sprocket 213 when the cassette 16 is inserted in the housing. The sprocket 213 is connected through a shaft 214 to a conventional slip clutch 215. The clutch 215 is connected to the output shaft 216 of a conventional DC drive motor TM.

When energized in the manner to be described, the motor TM rotates the shaft 216 to drive the sprocket 53 through the slip clutch 215. At the same time, the sprockets in the film 1 exposed in the film gate in the cassette 16 are arranged to be sequentially engaged to incrementally advance the film by means schematically indicated by a dotted line 217, in response to the operation of a conventional film pawl and shutter control mechanism 218. The mechanism 218 is connected to the shaft 216, to be driven thereby, by conventional means schematically shown at 219. A conventional shutter 220 is driven in synchronism with the film drive pawl, by means schematically shown at 221, to blank the projection aperture during film advance.

During incremental advance of the film as just described, a solenoid, not shown, is energized to engage a stop schematically shown at 222 with the hub 63 of the snubber roll described above. That action causes the takeup drive slip clutch 215 to slip, except when film is released by engagement of the drive pawl.

The projection aperture defined by the opening in the barrel 205 of the lens 206 is adapted to be closed at times by a lens cap 223. It will be understood that the lens cap is shown for simplicity; in practice, it would be replaced by appropriate operation of the shutter 220, or by the provision of a suitable solenoid-actuated blinder. When a cassette 16 is inserted in the housing, and the projection aperture is closed, as by the use of the lens cap 223, the housing 204 and cassette 16 comprise a lighttight housing about the portion of the film 1 exposed in the film gate, to facilitate processing operations.

The film drive and projection system comprises a projection lamp K adapted to supply collimated light, through a conventional condenser, schematically indicated at 224, to the prism 59 (FIG. 2) through the aperture 61 in the cover panel 22 when a cassette 16 is received in the housing 204. The lamp K is arranged to be energized during projection of processed film by a circuit which also energizes the motor TM, and which extends from the supply terminal at E+ through a conventional switch S1, and thence through the filament of the lamp K, in parallel with the winding of the motor TM, to ground.

When the motor TM and the projection lamp K are energized by closure of the switch S1, the stop 222 will be engaged with the snubber roll hub 63. The pawl and shutter control 218 will be operated to cause incremental advance of the film from the supply reel to the takeup reel. Assuming that the lens cap 223 is removed, sequential frames of the film will be projected through the lens 223 onto a suitable viewing surface schematically indicated at 225.

The viewing surface 225 may take the form of a diffusion screen spaced from the lens 223 and connected through an extension 226 of the housing 204 to receive light only from the lens, to form images which can be viewed from the outside of the apparatus. Alternatively, the viewing surface may comprise a reflection screen supported independently of the housing 204, as on a tripod.

An energizing circuit for the supply reel drive motor SM extends from the power supply terminal at E+, over a conventional switch S2, and through the winding of the motor TM to ground. When energized by closure of the switch S2, the motor SM will rewind the film onto the supply reel, for processing or storage, until the end of the film is reached on the takeup reel and the clutch 210 slips.

In order to expedite drying of the film after it is coated with processing composition as described above, it may be desirable to supply warm forced air to the cassette during the processing operation. For that purpose, light-baffled air inlet and exhaust ports are provided in the cassette, as suggested by the exhaust port 227 schematically indicated at 227. Warm air is supplied to a similar inlet port, not shown, in the base plate 19, by a conventional heater and blower schematically shown at 228. The heater and blower 228 may be supplied with operating energy when desired by closing a conventional switch S3.

Operation of the system of FIG. 53 will next be described with reference to the flow sheet of FIG. 54. Since the processing operation occuring in the cassette has been described in considerable detail above, in terms of the effects produced upon manipulation of the supply and takeup reels, and of the film drive pawl and snubber roll, attention will be primarily directed to the operation of the components of the film drive and projection system which effect those manipulations.

The circled numbers in FIGS. 53 and 54 identify sequential steps in the operation of the apparatus of FIG. 53. Operation will first be described on the assumption that a cassette 16 of exposed but unprocessed film is to be inserted in the film drive and projection system 204.

Referring to FIG. 2, when the film has been exposed, it will be stored substantially on the takeup reel, but with some distance yet to go onto the takeup reel before the end is reached on the supply reel. The tear-tab will be in position, as shown in FIG. 2, and the processor parts will be in the position shown in FIG. 24. At this time, the arm 82 is still in registry with the post 91, as shown in FIG. 5, so that there will be no interaction between the arm 82 and the supply reel 24 upon rotation in either direction of the supply reel.

Assume next that the cassette 16 is inserted into the housing 204 in FIG. 53. This event is symbolized by the circled numeral 1 in FIGS. 53 and 54, and results in the operative association of all the interacting parts of the cassette and of the film drive and projection system. In particular, the spring-loaded locating pin 128 will enter the recess 123 in the cover panel 22 of the cassette 16, releasing the tear-tab stripping arm 82 for interaction with the supply reel 24 as shown in FIG. 21.

Referring again to FIG. 53, when the cassette is inserted in the housing 204, the lamp K and its associated condensing system 224 is placed in registry with the aperture 61 in the cover panel 22. The sprockets 208 and 213 of the film drive system engage the supply reel drive sprocket 38 and the takeup reel drive sprocket 53, respectively. The stop and guide members symbolically illustrated at 207 locate and support the cassette 16. The heater and blower 228 is placed in operative relation to the air inlet port of the cassette. The snubber stop 222 is in position to, but does not, engage the snubber hub 63. The film drive pawl linkage 217 is now in operative relationship to the sprockets on the film 1, but not yet in operation.

The next step in the operation, symbolized as 2 in FIGS. 53 and 54, comprises the blanking of the projection aperture, as by placing the lens cap 223 over the lens 206. With the cassette in position, that completes the lighttight housing about the film 1 exposed in the film gate.

Step 3 in the operation comprises the closing of the switch S1 to supply drive energy to the takeup motor TM. That will cause the takeup reel drive sprocket 53 to be driven through the slip clutch 215, with simultaneous operation of the pawl and shutter control 218 to incrementally advance the film 1 onto the takeup reel. The shutter 220 will be operated at the same time through the linkage 221, but will be ineffective because the lens cap 223 blanks the projection aperture. The stop 22 is caused to engage the snubber hub 63.

As the film is advanced onto the takeup reel, the supply reel drive sprocket 38 will rotate, driving the sprocket 208 and the shaft 209 to operate the indicator IM through the connecting shaft 212 to indicate by rotation of the indicator needle that the film is moving in the cassette 16.

The switch S1 remains closed during an interval symbolized by the block labelled WAIT FOR IM in FIG. 54, meaning that operation is allowed to continue until the indicator IM stops to show that the drive clutch 215 is slipping because the second elongated sprocket hole 11 on the film has been reached. During the interval before that indication is produced, the pressure pad 158 in FIG. 24 will be erected, and moved to the position shown in FIG. 26.

Operation of the system during the advance mode, either for preprocessing erection of the pressure pad assembly or for subsequent projection of the processed film, may be terminated by engagement of a double film drive pawl with the second elongated sprocket hole 11 in FIG. 1, or, with the snubber disengaged, by advance movement of the film onto the takeup reel until the end of the film is reached on the supply reel. However, it is preferred to use the double pawl to terminate the operation, because the force required to erect the pressure pad is best supplied through the film by use of the film drive pawl mechanism, rather than relying on operation of the takeup reel through the slip clutch.

When the indicator IM stops, the switch S1 is opened, symbolized as step 4 in FIGS. 53 and 54. At the same time, the snubber stop 222 is disengaged. Next, the switch S2 is closed, symbolized as step 5, and the supply motor SM is operated to drive the supply reel drive sprocket 38 through the sprocket 208, shaft 209, and slip clutch 210.

Referring to FIG. 2, clockwise rotation of the supply reel 24 will occur, and, referring to FIG. 22, that will cause the tear strip actuating arm 82 to rotate clockwise, carrying the tear-tab away at least in part from the receptacle 73, and releasing the processing composition for supply to the coating nozzle as suggested in FIG. 23. The arm 82 will then be cammed into the retention slot 134 in the block 133, under the influence of the spring 104 as described above.

Referring again to FIG. 53, the supply motor SM will continue to operate, with rotation of the indicator IM, during a second interval labelled WAIT FOR IM until the slip clutch 210 slips, indicating that the end of the film has been reached on the takeup reel. During this interval, processing composition is coated on the film. If desired, the switch S3 may be closed at the same time the switch S2 is closed for step 5, causing warm air to be supplied to the cassette to dry the film as it is coated with processing composition. Assuming that that has been done, both of the switches S2 and S3 should be opened (step 6) when the indicator IM stops at the end of step 5.

The film in the cassette 16 has now been processed. Next, step 7, the lens cap 223 is removed. The apparatus is now in condition for the projection of processed film. For that purpose, as step 8 in FIGS. 53 and 54, the switch S1 is closed to cause operation of the takeup drive motor TM. The snubber stop 222 is again engaged. The pawl and shutter control 218 will now be operated through the shafts 216 and 219 to cause incremental advance of the film 1 by means of the pawl drive 217, and between intervals of the advnace of the film in this manner, opening of the shutter 220 to cause projection of sequential images on the screen 225.

The takeup reel drive sprocket 53 will be driven through the shaft 214 and slip clutch 215, so that the takeup and supply reels will be rotated. That will cause operation of the drive sprocket 38 for the supply reel, with concomitant operation of the indicator IM to indicate motion of the film within the cassette 16. During this interval of operation, processed film will be projected on the screen 225, where it can be observed by the user very soon after the film has been exposed.

Projection will continue, until the end of the reel, shortly whereafter the indicator IM will stop and the switch S1 can be opened, step 9 in FIGS. 53 and 54. For this purpose, the indicator IM is not really needed, because the end of projection can be detected by the cessation of projected images on the screen 225.

The film is now in condition to be rewound for storage. For that purpose, step 10 in FIGS. 53 and 54, the snubber stop 222 is disengaged, and the switch S2 is closed to cause operation of the motor SM to rewind the film onto the supply reel. As before, the switch S2 remains closed while the indicator IM is in motion, and is opened, step 11 in FIGS. 53 and 54, when the indicator IM stops. The cassette 16 can now be removed and replaced with another cassette of processed or unprocessed film.

Operation of the apparatus, in the event that a cassette of previously processed film is inserted in the system of FIG. 53, is symbolized in the flow diagram of FIG. 4 by the line labelled PROCESSED leading from step 1 to step 8, In other words, the film is inserted, with engagement of the interacting parts of the cassette and film drive and projection system as in step 1 described above, and the next operation is step 8, the closure of the switch S1 to drive the takeup motor TM to cause projection of the film as described above. The sequence of operations can then be continued in the manner described above.

FIG. 55 illustrates a useful feature for incorporation in the apparatus of the invention, whereby the film 1 is more readily handled immediately after processing. Referring first to FIG. 2, it will be apparent that the emulsion side of the film 1 is adjacent the working surfaces of various parts, such as the bobulator roll 54, idler 43 and snubber roll 49, shortly after the film has been coated. To avoid unnecessary contact with the emulsion at such times, the centers of the rollers are recessed. As shown in FIG. 55 in the typical construction of the idler 43, the rollers may be provided with edges 230 engaging the edges of the film 1, and a recessed central portion 231 that clears the emulsion 229 without contact. That construction prevents the buildup of wet processing composition on the roller surfaces.

Referring next to FIG. 56, there is shown a modification of the invention incorporating a normally disengaged reverse roll coater. The apparatus comprises a cassette generally designated 235, that may be identical in structure and function to the cassette 16 described above, except to the extent required to incorporate the specific modifications to be described. The cassette 235 comprises a base 236 formed from a base plate 237 on which upstanding walls 238 are integrally formed. On the base 236, after assembly of the working parts to be described, there is installed a cover generally designated 239 and including a cover plate 240 formed with integral side walls 241. The side walls 241 are adapted to cooperate with the side walls 238 of the base 236 to form an integral lighttight housing.

Formed by cooperating parts of the base 236 and cover 239 is an end flange 242. This flange 242 is adapted to cooperate with a film drive and projection apparatus of the type described above, or with a camera, to locate the cassette 235 in position for exposure, processing, or rewinding and projection.

Within the cassette 235 is rotatably mounted a supply reel 243 of the type described above, provided with a supply reel drive sprocket 244 formed integral with the reel. A strip of film 245 has one end connected to the spool of the supply reel 243, is wound convolutely thereabout, and extends therefrom to a conventional bobulator roll 246, journalled in the housing of the cassette 235 for rotational and translational movement for the purposes described above.

From the bobulator roll 246, the film 245 extends to and about an idler generally designated 247 that is journalled for rotation in the housing, by conventional means shown as a shaft 248. Formed integral with the idler 247 at its base, and extending below the path of the film 245, is a drive sprocket 249, adapted to cooperate with a coating roll drive sprocket 282, to be described.

The film 245 extends from the idler 247 through a light-baffled aperture 250 formed in the housing, comprising one side of a film gate, and thence back into the housing through a similar light-baffled aperture 251 forming the other side of the film gate. In its passage between the apertures 250 and 251, the film 245 is adapted either to be exposed in a camera, or to be projected, as will appear.

The film 245 next passes over a conventional snubber roll 252, functioning as described above to stop the film during advance movements except when the film is engaged by a drive pawl to advance it by one frame length. The snubber roll 252 is provided with a slotted hub 253 adapted to be engaged by external means, such as the stop 222 in FIG. 53.

From the snubber roll 252, the film extends to a takeup reel generally designated 254. The takeup reel is provided with an upper flange 256 on which a drive sprocket 255 is formed for the purposes described above. Also formed on the flange 256 is a tooth 257. The tooth 257 is adapted to cooperate at times to be described with a tooth 258 formed on a rack generally designated 259, to be described below.

The light shield for the cassette, about the film gate apertures 250 and 251, is completed by wall means 260 formed integral with the base plate 237, and adapted to be formed integral with the cover plate 240 upon assembly of the housing. As described above in more detail in connection with FIG. 2, within the wall 260 is located a prism generally designated 261, cooperating with an aperture 262 formed in the cover plate 240 and adapted to receive projection light and direct it through the film.

In accordance with this embodiment of the invention, the film processing apparatus in the cassette comprises a reverse roll coater having a housing generally designated 263. The housing 263 is journalled for rotation in the housing by means schematically shown as a shaft 264 formed integral with the base plate 237. The housing is held in the position shown in FIG. 56, in which it is in engagement with a stop 265 formed integral with the base plate 237, by means here shown as a spring 266 in compression between the housing 263 and a stop 267 formed integral with the base plate 237. A hook 268 is formed integral with the housing 263, and is adapted to cooperate at times with a hook 269, to be described below.

The container 263 comprises wall means 270 and 271, which, together with cover plates such as 272, define a chamber in which a tub-like receptacle 273 is mounted. The receptacle 273 contains a charge of processing composition 274 adequate to process the film strip 245. The charge 274 is initially retained in the receptacle 274 by a tear-tab 275 having one end sealed over the open side of the receptacle 273.

As best shown in FIG. 60, a portion of a chamber 276 defined by the walls 270 and 271 and outside of the initially-sealed receptacle 273 is adapted to receive the charge 274 of processing composition when the tab 275 is at least partially detached from the receptacle 273. Processing composition 274 thus released is applied to a capillary wick 277, of any suitable conventional material wettable by the processing composition. The wick 277 is mounted in a passage 278 formed in the container 263 between the wall 271 and an outer wall 279.

Processing composition supplied to the wick 277 is applied thereby to a coating roll 280. The roll 280 is journalled in the housing 263 by means shown as a shaft 281. The roll 280 is formed at its lower side, below the path of the film 245, with an internal drive sprocket 282, adapted to cooperate with the drive sprocket 249 formed on the idler 247 and described above.

In the initial position of the parts shown in FIG. 56, the sprocket 282 is out of engagement with the sprocket 249, and the hook 268 is out of engagement with the hook 269. The tear-tab 275 extends through an aperture 283 in the housing 263, and thence about an idler 284 journalled for rotation in the housing by means schematically shown as a shaft 285 formed integral with the base plate 237. From the idler, the tear-tab 275 passes over a second idler 286 journalled for rotation in the housing by means shown as a shaft 287 formed integral with the base plate 237.

The end of the tear-tab 275 extending beyond the idler 286 is formed with a loop 288 made by folding the tear-tab back upon itself and there joining it together by heat sealing, or by a suitable adhesive or the like. The loop 288 passes over a cooperating hook 289 formed on the rack 259.

Also formed on the rack 259 are a pair of shoulders 290 and 291 which are initially in engagement with a pair of posts 292 and 293 formed integral with the base plate 237. The posts 292 and 293 guide the rack 259 for translational or rotational movement, in a manner to appear.

On the end of the rack 259 is formed a hook 294, tat is adapted to cooperate at times with a stop 295 formed integral with the base plate 237. The rack 259 is urged lightly into engagement with the rim of the flange 256 by means shown as a spring 296 engaging the rack and secured in the housing between a pair of posts 297 and 298 formed integral with the base plate 237. As diagramatically indicated in FIG. 56, the spring 296 is wound for this purpose about the post 297, and is formed at its end with a hook engaging the post 298.

Referring next to FIGS. 57 and 58, movement of the tear-tab 275 in a manner to be described first effects rotation of the housing 263 about its shaft 264 into a film engaging position, in which the coating roll 280 engages the film 245, and in which the coating roll drive sprocket 282 is in engagement with the idler roll drive sprocket 249. In that position, the hook 268 formed on the housing 263 engages a hook portion 299 formed on the hook 269.

As best shown in FIG. 58, the hook 269 comprises an arm 300 formed intermediate its ends with an ear 301 in which an aperture 302 is provided to serve to pivot the hook 269 for rotation in the housing about a shaft 303 (FIG. 56) formed integral with the base plate 237. The arm 300 extends to a cross piece 304 on which a pair of hook arms 305 are formed.

As shown in FIG. 58, the arms 305 have rounded leading edges 306, and flat trailing edge portions 307. The hooks 305 are adapted to cooperate with notches formed in the strip of film 245.

Referring to FIG. 59, the strip of film 245 adapted to be used in this embodiment of the invention may be of the form described above in connection with the film 1 shown in FIG. 1, except as modified to be described. In particular, as shown in FIG. 59, the film 245 is provided at one end with an aperture 309 to adapt it for connection to the supply reel, and at the opposite end with an aperture 310 to adapt it for connection to the takeup reel.

The primary portion of the film intermediate its ends is covered with a strip of emulsion 311, of the type described above, on which images are adapted to be formed and processed. The film 245 is provided with sprocket holes, as indicated at 312, for the purposes described above. Although not shown, these sprocket holes may be interrupted by first and second elongated sprocket holes, such as 10 and 11 in FIG. 1, for the purposes described above.

Adjacent the leading end of the film 245 adapted to be connected to the takeup reel are a pair of side notches 313, formed on opposite edges of the film, and adapted to cooperate with the hooks 305 forming a part of the hook 269 as shown in FIG. 58. It will be apparent that if the notches 313 are moved past the hook 269 generally downwardly and to the left as shown in FIG. 58, the rounded leading edges of the hooks 305 will enter and leave the notches 313 without appreciable effect. However, upon passage of the notches 316 generally upward and to the right in FIG. 58 with respect to the hooks 305, the flat ends 307 will be engaged by the trailing edges of the notches and the hook 269 will be pivoted, counterclockwise as shown in FIG. 57, about the shaft 303. That movement is adapted to release the hook 268 formed on the container 263 of the roll coater described above, after processing of the film, in a manner to be described.

Having described this embodiment of the invention, its operation will next be described in connection with FIGS. 56, 57, 60 and 61.

First, assume that the film 245, initially unexposed and stored primarily on the supply reel 243 as shown in FIG. 56, is exposed in the camera. During such exposure, the film will be transferred substantially from the supply reel 243 to the takeup reel 254. During that operation, the takeup reel 254 will be rotated clockwise as seen in FIG. 56, and the tooth 257 will simply deflect the tooth 258 on the rack 259 without effective engagement with the tooth 258. The rack 259 may rotate somewhat about the axis established by the shoulders 290 and 291 and the posts 292 and 293 during this operation, without substantially displacing the tear-tab 275.

Assume next that the takeup reel 254 is further rotated, as by use of the apparatus described above in connection with FIG. 53, to advance the film still further onto the takeup reel, until a second elongated sprocket hole such as 11 in FIG. 1 is encountered, or until the end of the film on the supply reel is reached. The purpose of such movement in this embodiment of the invention is to allow a longer film run prior to processing for the purpose of loading the coating roll 280 with processing composition, and to ensure that the coating operation affects all of the photographically useful portion of the film uniformly.

Assume next that the supply reel 243 is rotated clockwise in FIG. 56, to rewind the film. That will cause counterclockwise rotation of the takeup reel 254, bringing the tooth 257 into engagement with the tooth 258 on the rack 259. The rack 259 will then be moved upwardly and to the left in FIG. 256, placing the tear-tab 275 in tension. The first effect will be to rotate the coater 263 clockwise in FIG. 56, bringing the roll 280 down into engagement with the film 245. The hook 258 will engage the hook 269. The idler sprocket 249 will now engage the drive sprocket 282 formed integral with the coating roll 280, causing the coating roll to be driven oppositely to the direction of movement of the film 245.

The tear-tab 275 will next be at least partially detached from the receptacle 273, allowing the processing composition 274 to flow down into the chamber 276 and wet the wick 277. The processing composition is then passed up through the wick 277 for application to the coater roll 280, whereupon it is coated on the emulsion side of the film 245 as the film continues to be rewound onto the supply reel 243.

Continued rotation of the takeup reel 254 will cause the rack 259 to be driven into engagement with the stop 295, as shown in FIG. 61. The hook portion 294 formed on the end of the rack 259 will be engaged by the stop 295, and the rack 259 will thereby be held out of further engagement with the tooth 257 during subsequent rotation of the takeup reel 254 in either direction.

Operation will continue until the processing composition 274 is substantially all coated on the film 245, and the film has been transferred primarily to the supply reel 243. As the film nears the end of its run towards the supply reel, the notches 313 shown in FIGS. 58 and 59 will approach and engage the edges 307 formed on the hook arms 305, causing the hook 269 to be rotated counterclockwise as seen in FIG. 57 and disengage the hook 268 formed on the housing 263. The housing 263 will thus be allowed to rise, rotating counterclockwise in FIG. 57, under the influence of the spring 266, and be driven back into engagement with the stop 265. Thereafter, the roll coater will not be effective to interfere with the manipulation of the film in the housing. The operations of projecting the processed film, and then rewinding it onto the supply reel, may be carried out as described above in connection with the embodiment of FIG. 2.

FIGS. 57a and 61a show a modification of the apparatus of FIG. 56, whereby additional protection against contamination of the apparatus by processing composition can be obtained. Parts other than those specifically designated may be the same as those described in connection with FIG. 56, and modified or additional parts are given modified or additional reference characters, as will appear.

Adjacent the tear-tab 275 in the chamber 276, the wall 271a of the container is formed with a pocket 314 in which a sponge-like pad 315 of capillary material, wettable by the processing composition, is inserted. The pad 315 may be of the same construction as that described above in connection with the pad 202 in FIG. 2. When the tear-tab 276 is partially detached from the receptacle 273 to release the processing fluid, any subsequent tendency for the processing composition to escape through the aperture 283 in the container 263a is prevented by wetting of the sponge 315, causing it to swell as shown in FIG. 61a to seal the opening 283 and prevent the further escape of processing composition.

FIG. 62 shows a further modification of the invention. The apparatus of this embodiment may be identical to that described above in connection with FIG. 56, except for the exceptions to be noted. Specifically, referring to FIG. 56, the supply reel 254 need not be provided with a tooth 257, and the rack 259 and its associated parts are not needed. Similarly, the idler 286 is not required. Referring to FIG. 59, another difference is that the film strip 245, while otherwise the same, need not be provided with the notches 313.

As in the embodiment of FIG. 56, the apparatus of FIG. 62 comprises a reverse roll coater having a housing 263 mounted for rotation about a shaft 264 affixed to the base plate 237. In the initial position shown in FIG. 62, the housing 263 is urged into engagement with the stop 265 by the spring 266 compressed between the housing 263 and the stop 267, as described above.

Also, a hook 268 is formed integral with the housing 263, and serves at times to hold the housing in film engaging position. However, the stop 268 does not cooperate with a hook of the form shown at 269 in FIG. 56, but with a modified hook 316. The hook 316 is pivoted in the housing by means here shown as a pivot pin 317 formed integral with the base plate 237.

The tear-tab 275 in the apparatus of FIG. 62 is initially sealed over the surface of the receptacle 273, for the purposes described above, and extends out of the housing 263 about the idler 284 described above. From the idler 284, the tear-tab 275 extends directly to a loop 288 formed at its end, which engages a post 318 formed integral with a first rack 319.

The rack 319 is adapted to cooperate with teeth 320 formed on a first flange 321 comprising an integral part of a specially formed supply reel generally designated 322. As best shown in FIG. 63, the supply reel 322 comprises an axle 323 formed at its base and borne in a cylindrical recess 324 formed in the base plate 237 to journal the reel 322 for rotation in the housing. Above the axle 323 is a plane base flange 325 formed integral with the axle and with a spool portion 326 to which the film 245 is adapted to be attached, and about which it is adapted to be wound, as shown in FIG. 63. The upper side of the spool portion 327 is formed integral with a third flange 327, on which teeth 328 are formed as best shown in FIG. 62.

Formed integral with the upper flange 321 of the supply reel 322 is a hub portion 329 extending upwardly to an integrally formed drive sprocket 330, that protrudes through a recess 331 formed in the cover plate 240. A light-baffling annular flange 332 may be formed about the recess 331, as shown in FIG. 63, to prevent the entrance of light through the recess.

Referring to FIG. 62, a series of teeth 333 are formed on the rack 319 in position to cooperate with the teeth 320 formed on the flange 321 of the supply reel 322 when the supply reel is rotated clockwise as seen in FIG. 62. For purposes of this interaction, the rack 319 is normally held lightly into engagement with the teeth 320 by a resilient spring 334 held at one end in a support 335 fixed with respect to the base plate 237.

It will be apparent that the construction is such that when the supply reel 322 is rotated counterclockwise in FIG. 62, that is, in the direction in which it rotates when film is being advanced onto the takeup reel, the teeth 320 will glance over the teeth 333, without appreciable movement of the rack 319 except for slight movements up and down in FIG. 62. However, when the reel 322 is rotated clockwise in FIG. 62, as it would be when film is being returned to the supply reel, the teeth 320 will engage the teeth 333 and drive the rack 319 to the left in FIG. 62, to detach the tear-tab as will be described.

A second rack 336 is formed integral with a standoff arm 337 that initially engages a downwardly extending projection 338 formed on the rack 319 as shown in FIG. 63. A series of teeth 339 are formed on the rack 336, as shown in FIG. 62. The standoff arm 337 holds these teeth 339 out of engagement with the series of teeth 328 formed on the flange 327 as described above. The rack 336 is urged into this initial position by a spring 340 mounted at one end in a support 341 formed integral with the floor plate 237.

The rack 336 is provided with an enlargement, as indicated at 342, in which there is formed a slot 343 that couples the rack 339 with lost motion to a pin 344 formed integral with a lever 345. The lever 345 is pivotally mounted to the base plate 237 by means of a pin 346 fixed in a support 347 formed integral with the base plate. The other end of the lever 345 is connected, as indicated at 348, to a cable 349, of wire or the like, attached at its other end to the hook 316, such that clockwise rotation of the lever 345 about its pivot pin 346 will rotate the hook 316 clockwise, about its pin 317, urging the hook against a spring 350. The spring 350 is connected at one end to a support 351 formed integral with the floor plate 237.

The rack 319 is adapted at times to engage a pair of stops 352 and 353 formed integral with the floor plate 237, for purposes to appear. Similarly, the rack 336 is adapted at times to engage stops 354 and 355, also formed integral with the floor plate 237, for reasons to appear.

Having described this embodiment of the invention, its operation will next be described with reference to FIGS. 62-66. For that purpose, assume first that the film has been exposed in a camera, so that it is nearly all stored on the takeup reel, not shown in FIG. 62, with but short distance to run to its end on the supply reel 322. During exposure, the supply reel 322 will be rotated counterclockwise in FIG. 62, without actuation of the rack and lever assembly described above. Similarly, any further advance of the film 245 away from the supply reel will effect no operation of the processing apparatus. However, as soon as a rewind operation is begun, the teeth 320 will engage the teeth 333 on the rack 319, moving the rack 319 to the left in FIG. 62.

The first effect of this movement of the rack 319 is to exert tension on the tear-tab 275 effective to erect the processor by rotating the housing 263 clockwise in FIG. 62 about its pivot pin 264, compressing the spring 266 and bringing the coating roll 280 into engagement with the film 245. The hook 268 will now engage the hook 316, which will retain the processor in its erected position as shown in FIG. 64. The coating roll 280 will now be driven through its sprocket 282 in engagement with the idler sprocket 249, as described above. Next, further movement of the rack 319 will at least partially detach the tear-tab 275 from the receptacle 273, as shown in FIG. 64, releasing processing composition in the receptacle 273 for coating on the film in the manner described above.

During movement of the rack 319 to the left in FIG. 64, the projection 338, formed on the rack 319 as shown in FIG. 63, will pass the standoff post 337 formed integral with the rack 336, and allow the rack 336 to approach and engage the teeth 328, formed on the flange 327, under the influence of the spring 340. So long as the reel 322 continues to rotate in a clockwise direction, taking film onto the supply reel, and during the coating operation, the teeth 328 will simply glance off the teeth 338 formed on the rack 336, and effect no substantial movement of the rack 336.

The rack 319 will continue to move to the left in FIGS. 64 and 65, detaching further portions of the tear-tab 275 from the receptacle 273, until the first of the teeth 333 on the rack 319 engages and latches against the stop 353. At the same time, the stop 352 will be engaged, and slide across the rack 319 until the latter reaches its final position in engagement with the stop 353, as shown in FIG. 65, whereupon the rack 319 will be held out of further engagement with the supply reel.

Operation will continue, with film moving onto the supply reel 322, until the processing composition is exhausted and applied to the film 245, and the end of the film is reached on the takeup reel. The film is now processed and ready for projection. When it is projected, as by use of the apparatus shown in FIG. 53, the film will be incrementally advanced onto the takeup reel as described above, with a resulting rotation of the supply reel 322 in a counterclockwise direction as seen in FIG. 65. That will cause the teeth 328 to engage the teeth 339 formed on the rack 336, and cause movement of the rack 336 downward and to the right in FIG. 65. The pin 344 will be engaged, causing the lever 345 to be rotated clockwise as seen in FIG. 65, and thereby detaching the hook 316 from the hook 268. That will allow the housing 263 to rise under the influence of the spring 266, back into engagement with the stop 265 as shown in FIG. 66.

The rack 336 will continue to move until it is finally driven into engagement with the stop 355, which will latch into a corresponding notch formed on the end of the rack 336 as shown in FIG. 66. The stop 354 will slide along the side of the rack 336, so that in the final position of the parts shown in FIG. 66, the rack 336 will be held in position against the stops 354 and 355 by the spring 340. In that position, it will be out of engagement with the teeth 328 formed on the supply reel, and no further interaction between the parts will take place as the film is subsequently transported back and forth between the supply reel and the takeup reel.

While the invention has been described with respect to the details of various illustrative embodiments thereof, many changes and variations will occur to those skilled in the art upon reading the description, and such can obviously be made without departing from the scope of the invention.

Having thus described the invention, what is claimed is:

1. Photographic apparatus for use with a film handling cassette including a housing, a strip of film stored within the housing, normally inoperative first means for applying a processing composition to an incremental section of the film strip, the first cassette means including means for releasably storing a quantity of the processing composition sufficient to treat substantially the entire length of the film strip, second means responsive to externally mounted actuating means for progressively transporting the film strip transverse the first cassette means, the second cassette means including a rotatably mounted member to which the film strip is connected and third means for rendering the first cassette means operative whereby substantially the entire length of the film strip may be treated with the processing composition, the third cassette means including means for releasing the processing composition from the fluid storing means of the cassette responsive to a force being exerted thereon and means for coupling the composition releasing means of the cassette to the rotatably mounted member thereof whereby the rotatably mounted member exerts force on the composition releasing means of the cassette, the coupling means of the cassette being initially disposed out of operable relationship with respect to the rotatably mounted member and the third means of the cassette including means responsive to externally mounted actuating means for effecting an operable relationship between the coupling means of the cassette and the rotatably mounted member, said apparatus including means for receiving the cassette, means for actuating the second cassette means and actuating means for effecting an operable relationship between the cassette's coupling means and its rotatably mounted member.

* * * * *